United States Patent [19]

Yamakawa

[11] Patent Number: 4,672,677
[45] Date of Patent: Jun. 9, 1987

[54] CHARACTER AND FIGURE PROCESSING APPARATUS

[75] Inventor: Tadashi Yamakawa, Yokohama, Japan

[73] Assignee: Canon Kabushiki Kaisha, Tokyo, Japan

[21] Appl. No.: 799,169

[22] Filed: Nov. 18, 1985

[30] Foreign Application Priority Data

| Nov. 19, 1984 | [JP] | Japan | 59-242518 |
| Nov. 19, 1984 | [JP] | Japan | 59-242519 |
| Dec. 11, 1984 | [JP] | Japan | 59-260018 |
| Dec. 11, 1984 | [JP] | Japan | 59-260019 |
| Dec. 11, 1984 | [JP] | Japan | 59-260020 |

[51] Int. Cl.⁴ .............................................. G06K 9/00
[52] U.S. Cl. ...................................... 382/13; 178/18; 382/57; 382/59
[58] Field of Search ....................... 382/13, 57, 58, 59; 178/18, 19, 20; 340/706, 707, 712

[56] References Cited

U.S. PATENT DOCUMENTS 4,112,415  9/1978  Hilbrink ................................. 382/13
4,184,147  1/1980  Seelbach ............................... 382/13

FOREIGN PATENT DOCUMENTS 58-75698  11/1984  Japan .................................... 382/57

Primary Examiner—Leo H. Boudreau
Attorney, Agent, or Firm—Fitzpatrick, Cella, Harper & Scinto

[57] ABSTRACT

A character and figure processing apparatus comprises a coordinates input tablet having a handwriting input area for receiving a handwritten character input and a display, a designating unit for designating the coordinates on the coordinates input tablet, including the handwritten character input, a recognizing unit for recognizing a character input to the area, a display controller for displaying a proposed character with regard to the recognized character on the display area of the display, and a selecting unit for selecting, when the display area displaying the proposed character is designated by the designating unit, the character as the character input to the handwriting input area.

6 Claims, 40 Drawing Figures

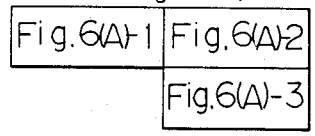
Fig. 6(A)-1
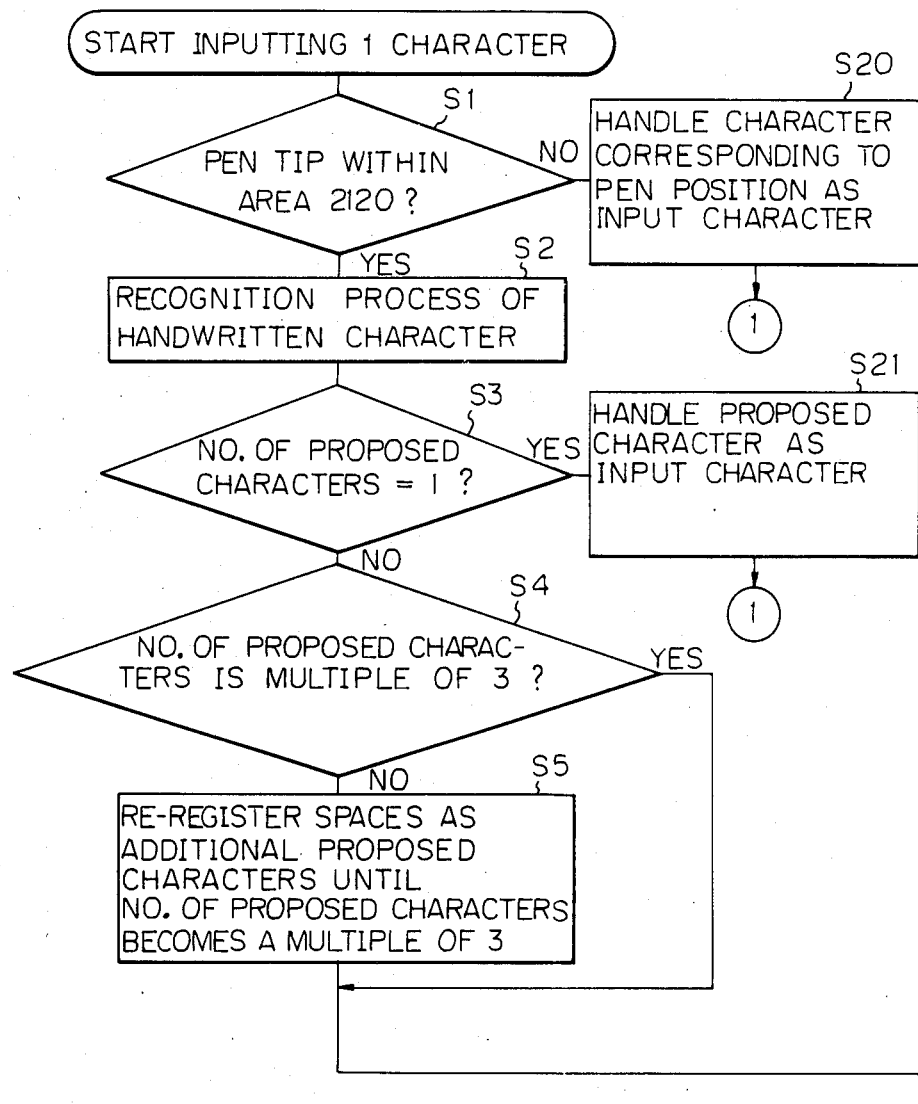

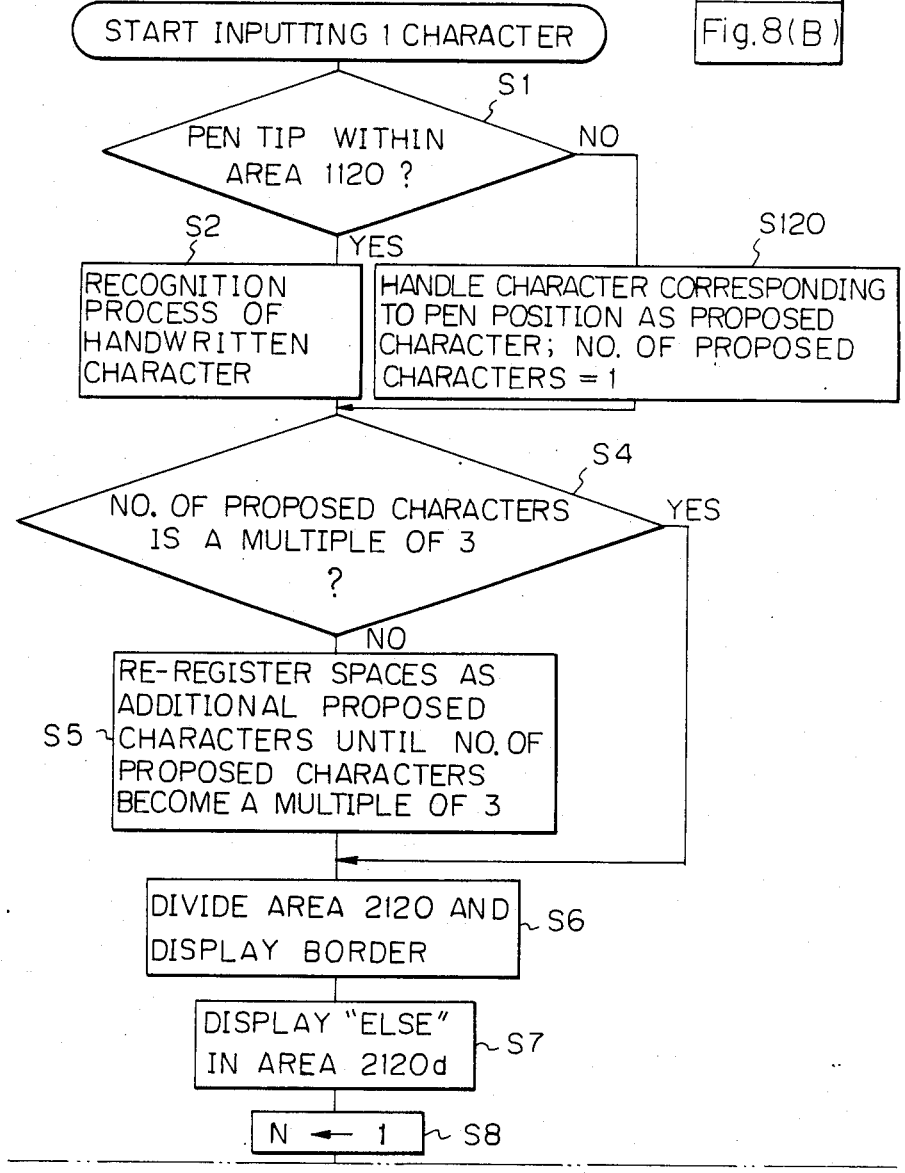

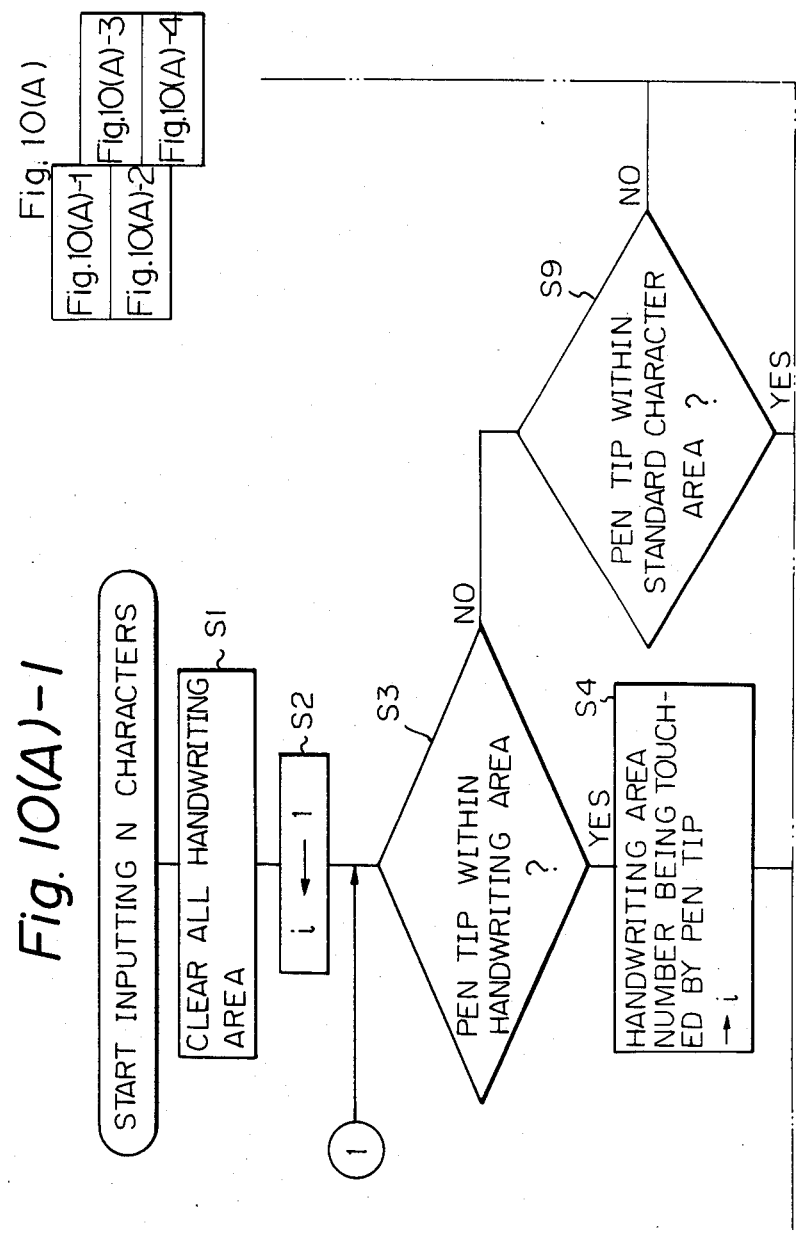

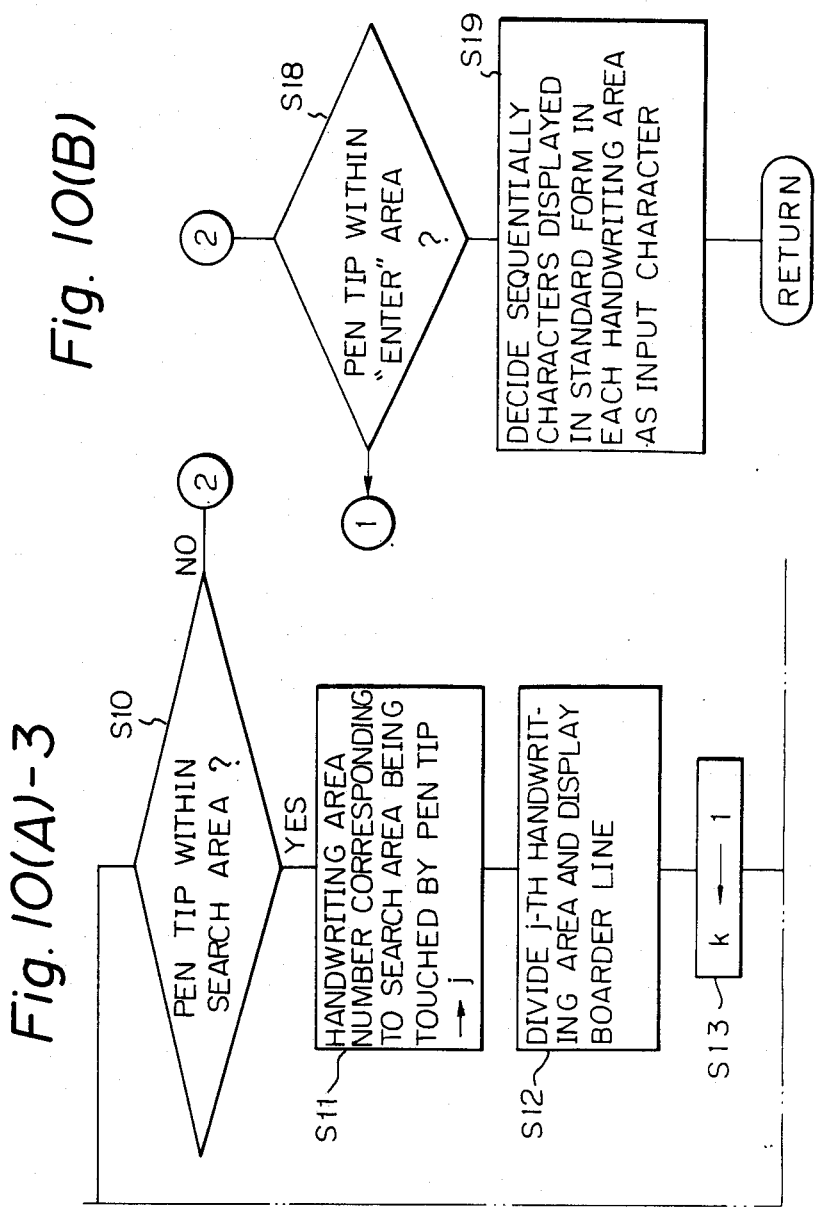

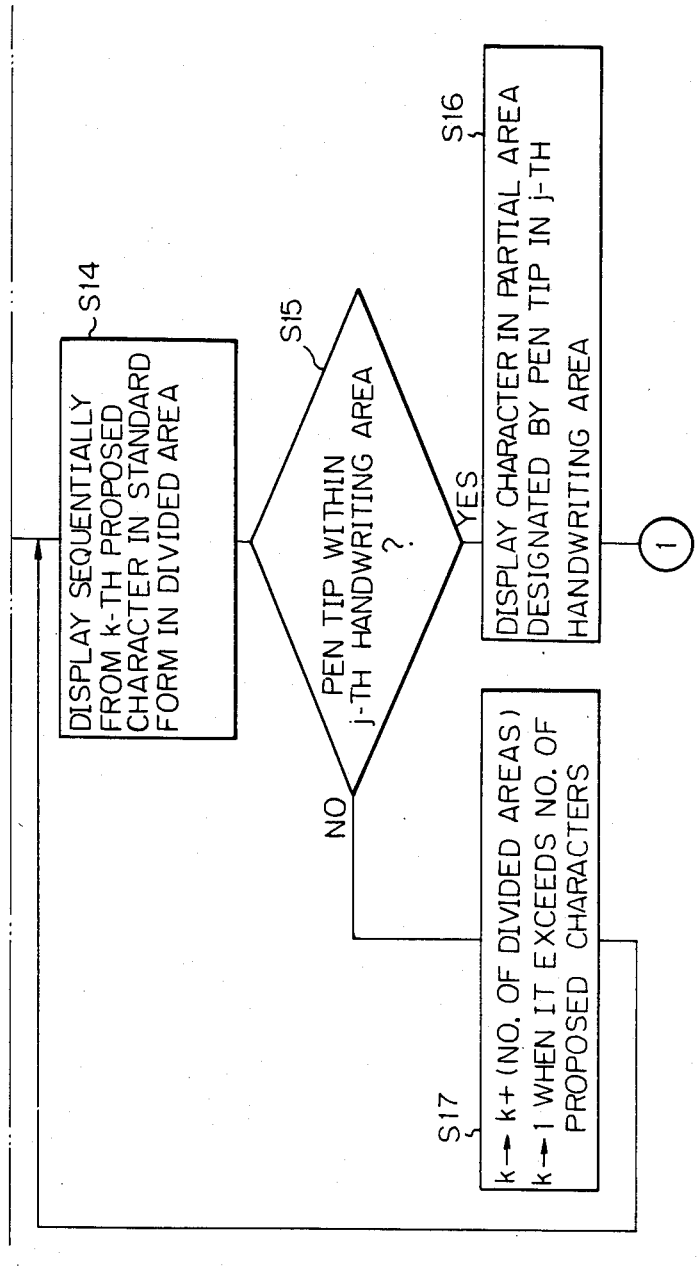

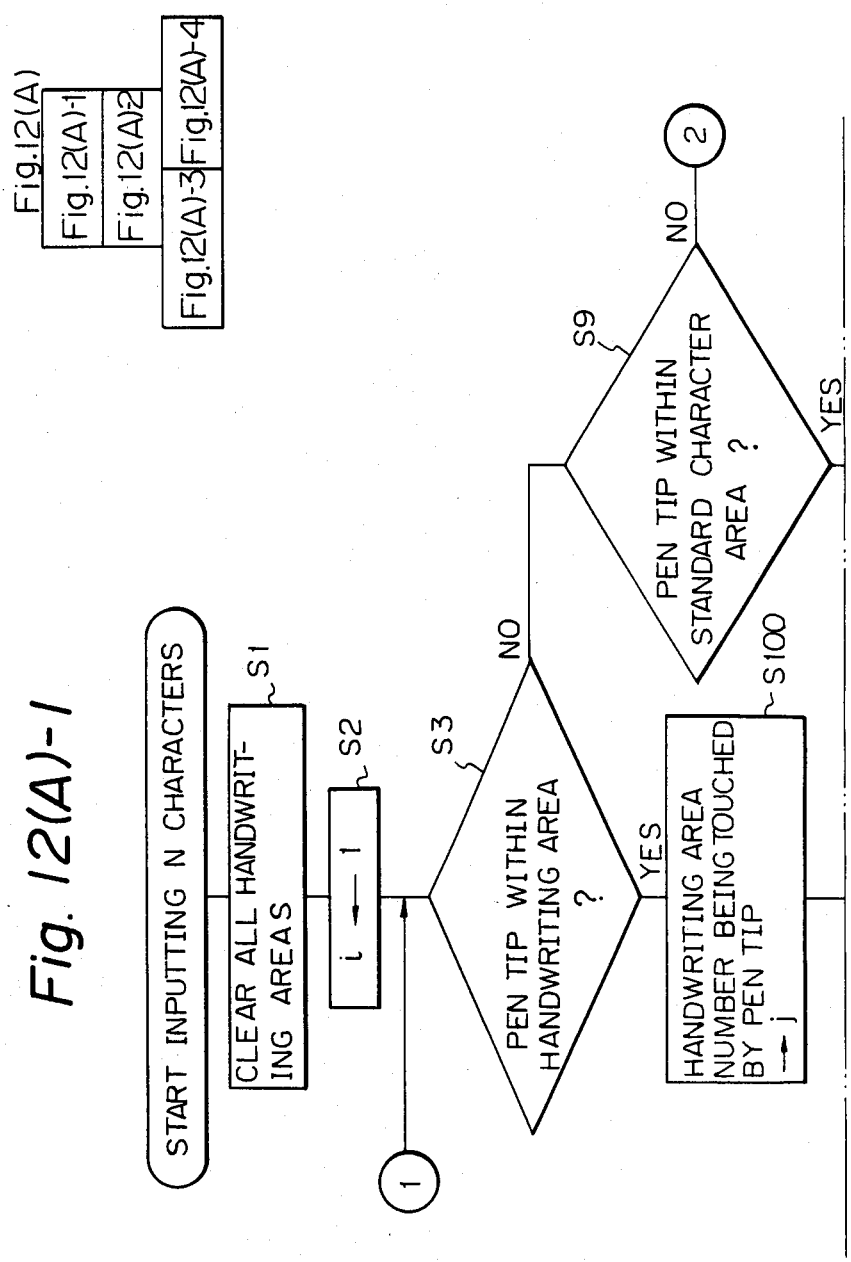

CHARACTER AND FIGURE PROCESSING APPARATUS

BACKGROUND OF THE INVENTION

1. Field of the Invention

This invention relates to a character and figure input-output apparatus suitable for use in a personal computer, a word processor, a graphic work station or the like, and in particular to a character and figure processing apparatus for outputting information handwritten and input by an on-line or the result of the information having been data-processed.

2. Description of the Prior Art

As a character and figure input-output apparatus applied to a personal computer, a word processor or the like, one comprising a combination of a keyboard input as an input device and a CRT as a display output device has heretofore been popular.

However, in an apparatus of this type, when a Chinese sentence is to be input, an inconvenience is sometimes experienced in inputting it by a keyboard. That is, where a key is allotted to a Chinese character, the number of keys exceeds 2,000 and even if a necessary number of keys are arranged, it requires much time for a beginner to look for a key position corresponding to a Chinese character to be input, and this leads to low operability.

Also, use has widely been made of apparatuses in which an input is effected in kana or Roman letters from a keyboard by the use of kana-Chinese character interchange means or the like, whereafter the kana or Roman letters are converted into a Chinese character corresponding thereto, but typewriters are originally unfamiliar to many Japanese and moreover, a typewriter requires its operator to effect several typing operations including vowels and consonants in inputting a Chinese character. The pronunciation of any Chinese character is variable and, when a pronunciation is to be converted into a Chinese character, a number of Chinese characters are usually proposed and a Chinese character displayed as a first proposed character is not always a desired Chinese character and therefore, there often occurs a situation in which selection must be made from among several proposed characters and thus, the number of typing operations is increased.

SUMMARY OF THE INVENTION

In view of the above-noted points, it is an object of the present invention to provide a character and figure processing apparatus in which even a beginner can very easily input or output alphabetical letters, Chinese characters, figures, etc.

It is another object of the present invention to provide an input apparatus in which selection or setting of characters or figures is effected at an input portion and which eliminates the cumbersomeness of making input confirmation while alternately watching, for example, the CRT or LCD of an apparatus body such as a personal computer, and a keyboard which is the input portion and in which the inputting operation at the input portion and operations concerned with inputting can all be accomplished simply by watching the input portion.

It is still another object of the present invention to provide an apparatus in which the inputting of data to a body such as a personal computer can be accomplished at an input portion simply by watching only the input portion and thereafter editing or the like can be effected at a display portion such as the CRT of the body such as the personal computer.

The present invention also covers a system including a personal computer body or the like including a character and figure processing apparatus.

BRIEF DESCRIPTION OF THE DRAWINGS

Figs. 6(A), 6(B), 6(A)-1, 6(A)-2, 6(A)-3, 10(A), 10(B), 10 (A)-1, 10(A)-2, 10(A)-3, 10(A)-4, 12(A), 12(B), 12(A)-1, 12(A)-2, 12(A)-3 and 12(A)-4 are flow charts showing an example of the input processing procedure according to an embodiment of the present invention.

FIGS. 8, 8(A), 8(B) and 14 are flow charts showing an example of the input processing procedure according to another embodiment of the present invention.

DESCRIPTION OF THE PREFERRED EMBODIMENTS

The present invention will hereinafter be described in detail. Recognition of on-line handwritten characters is conceived for an increase in the number of typing operations of the above-described word processor or the like.

Figure 1:
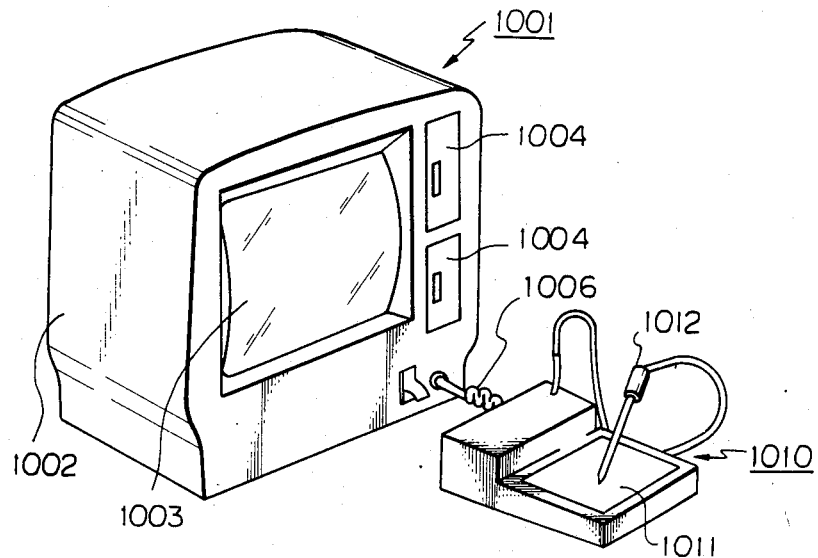
FIG. 1 is a perspective view showing a popular example of the construction of a character and figure input-output apparatus.

FIG. 1 shows, as an example of such an on-line handwritten character input apparatus, a personal computer 1001 using a digitizer 1010 provided with a display device. The personal computer body 1002 is provided with a CRT 1003 and a floppy disc drive 1004. The digitizer 1010 provided with a display device is connected to the personal computer body through a cable 1006. The digitizer 1010 provided with a display device has a graphic display mounted under a transparent digitizing tablet 1011. When the tip of an exclusive pen 1012 touches the tablet 1011, the position of the pen tip is detected and input to the personal computer body 1002 as coordinates information. Also, display on the graphic display mounted under the tablet 1011 is made possible by the personal computer body 1002. This transparent tablet enables the position of contact of the pen tip with the surface of the tablet to be input as coordinates, for example, by an electromagnetic induction system or the like.

By the pen 1012 being caused to touch the tablet, the coordinates of the corresponding point on the tablet surface 1011 are input to the personal computer body 1002. For example, areas 1110, 1111, 1112 and 1113 shown in FIG. 2 correspond to the "rightward movement", "upward movement", "leftward movement" and "downward movement", respectively, of a cursor displayed on the CRT 1003, and when the exclusive pen 1012 is caused to touch the area 1110, the cursor on the CRT 1003 moves rightwardly by an amount corresponding to a character. That is, by causing functions allotted to the keys of a keyboard to correspond to the partial areas of the tablet 1011, the function of the keyboard is realized on the tablet 1011. Also, an area 1120 is a graphic input area, and the graphic display as previously described is mounted under at least the area 1120. When a character or a figure is depicted in the area 1120 by the exclusive pen 1012, the locus of the tip of the exclusive pen 1012 becomes a change of the coordinates and is sequentially input to the personal computer body 1002. The personal computer body sequentially displays this locus on the graphic display under the area 1120. Thus, the operation can input the character or the figure while confirming the locus of the pen tip by the use of the exclusive pen 1012 as if the operator wrote a character or a figure on paper by means of a pencil. That is, the personal computer body 1002 inputs data with the locus of the pen tip as a time-serial change of the coordinates.

Figure 3:
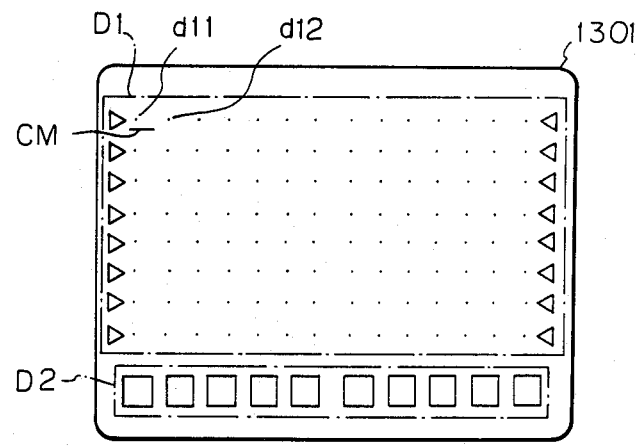
FIG. 3 illustrates the display state of a CRT screen during the character or figure inputting operation in the conventional apparatus.

Referring to FIG. 3 which shows the display screen 1301 of the CRT 1003, reference character D1 designates a display area for displaying input characters or the like, reference character D2 denotes a display area for characters mentioned as proposed characters, and letters CM designate a cursor.

Figure 2:
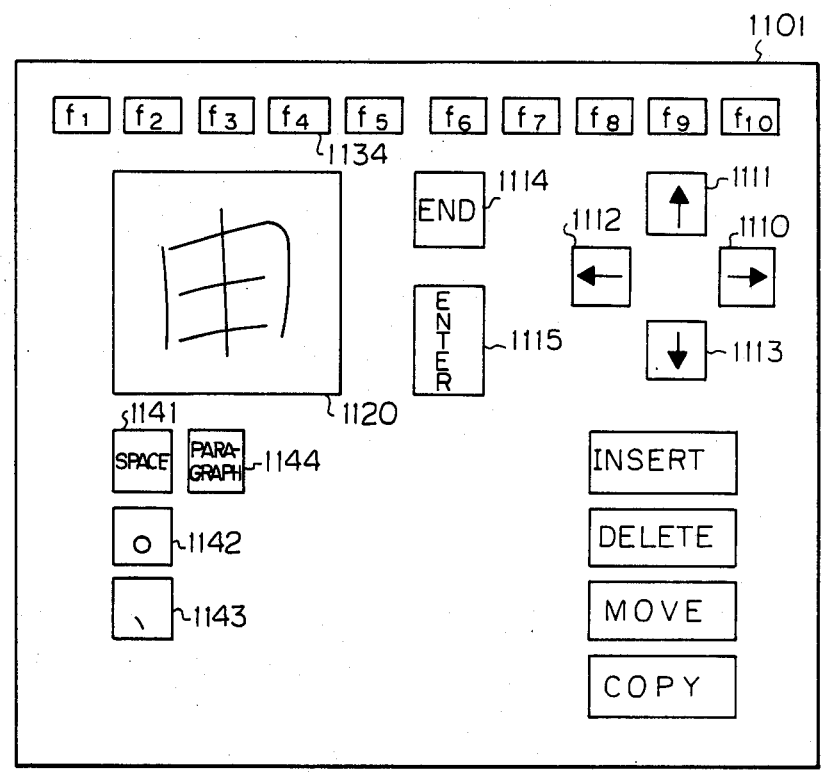
FIG. 2 is a plan view showing a tablet as an input/display device used in a conventional character and figure input-output apparatus.

Now, in FIG. 2, the operator writes "書" in the area 1120. Whereafter, when the pen tip touches the area 1114, the end of the inputting of a character is recognized by the personal computer body 1002. In the meantime, recognition of a handwritten character is effected in the personal computer body 1002 and the input character is determined. As a result, the character written in the area 1120 is recognized as "書" and is displayed in a bold type in the first column d11 of the first line in FIG. 3 and the cursor CM moves to the second column d12 of the first line. Then, in a display area D2, for example, "書", "書", "書" and "書" including characters mentioned as other proposed characters are displayed in succession from the left. At this time, by an area 1134 being designated by the exclusive pen 1012, "書" is selected, and subsequently, by the exclusive pen touching an area 1115, "書" is selected, and "書" is displayed in a usual display type on the first column d11 of the first line. In the foregoing, an example in which "書" is proposed when the operator fancies that he has input "書" has been shown, but when the operator fancies that he has input "書", the inputting of a character is completed simply by touching the area 1115.

Also, when inputting a special symbol such as space, punctuation or paragraphing, the operator designates those areas 1141–1144 by the pen tip and proceeds with the inputting process while confirming the display content displayed on the CRT screen.

However, in conventional apparatus, a character is written into the area 1115, or the special symbol designating areas 1141–1144 are designated to thereby cause these areas to recognize the character or symbol as a handwritten character or symbol, whereafter the operator must select or correct the character or symbol while referring to the CRT screen each time. Therefore, the character input speed is extrememly reduced and, in addition, the operator must watch the CRT and the digitizer alternately, and this has led to a problem that the operator's eyes become fatigued. The present invention overcomes this problem.

Figure 4:
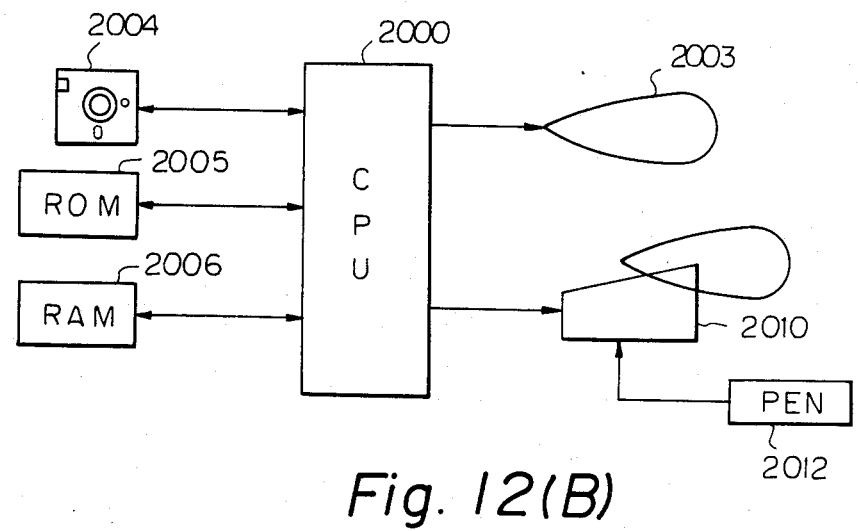
FIG. 4 is a block diagram showing an example of the construction of the character and figure input-output apparatus of the present invention.
Figure 12B:
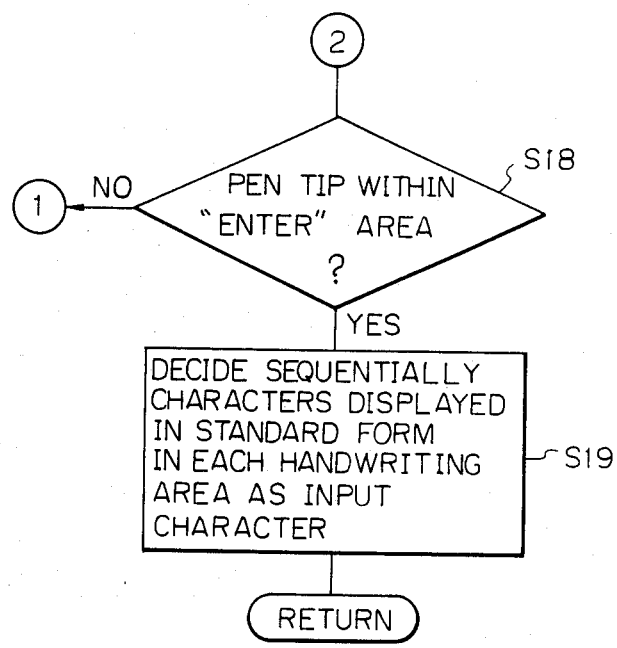

First Embodiment:

FIG. 4 shows an example of the construction of the apparatus of the present invention. In FIG. 4, reference numeral 2000 designates a CPU for controlling various portions and executing the processing which will later be described with reference to FIG. 6 or FIGS. 8, 10, 12, 14 and 15. Reference numeral 2003 denotes a CRT, and reference numeral 2004 designates a floppy disc as an external memory medium and a driving device therefor. These portions 2003 and 2004 may be ones equivalent to the portions 1003 and 1004 shown in FIG. 1. Reference numeral 2005 denotes a ROM storing therein the processing procedures shown in FIG. 8, and reference numeral 2006 designates a RAM having an area for developing a Chinese charactor dictionary read out from the floppy disc 2004 at the starting of the apparatus and a working area used during the processing. Reference numeral 2010 denotes a digitizer provided with a display device, i.e., provided with a graphic display under a transparent tablet, and reference numeral 2012 designates a pen.

Figure 5:
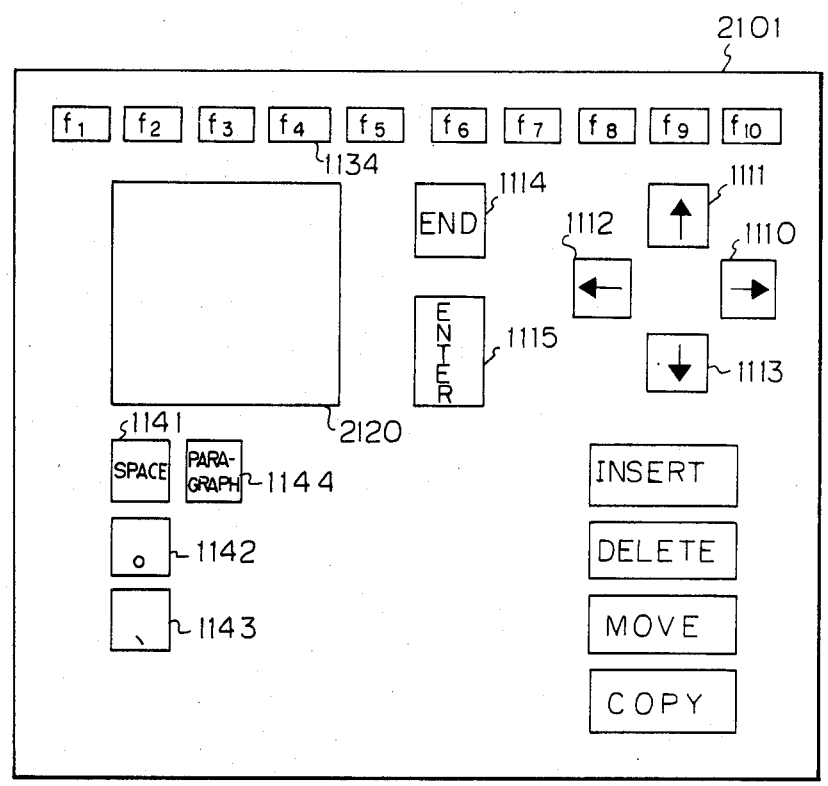
FIGS. 5 and 9 are plan views showing a tablet as an input/display device used in the apparatus of the present invention.

FIG. 5 shows an example of the operating surface 2101 of the digitizer 2010. In FIG. 5, areas similar to those on the operating surface 1101 in FIG. 2 are given similar reference numerals.

Reference numeral 2120 designates a graphic input/display area, and in the present example, a graphic display is provided at least under this area to enable display. For the character recognition of a Chinese character, the tablet is required to be capable of digitizing the pen tip with a resolving power of 3 dots/nm or more and, in practice, it is possible to use a tablet of the electromagnetic induction type of a resolving power of 10 lines/mm and 100 points/sec. sample or so. However, the graphic display disposed under this need not be of so high a density, but for example, when the area 2120 is of the order of 2 cm×2 cm, a graphic display of the order of 3 dots/mm will suffice. At this time, by causing the position of the tablet coordinates of a plurality of points near a displayed dot of the graphic display to correspond to this displayed dot, the locus of the pen tip during the inputting may be thickly displayed.

Also, in the present embodiment, characters recognized by referring to the dictionary developed in the RAM 2006 are replaced with handwritten characters and displayed on the graphic display under the area 2120.

In a case where there is a plurality of proposed characters, they are displayed with the display area of the display being divided by a displayed border line. Usually, many of the Chinese characters can be approximately expressed by 16 dots×16 dots, and even a complicated character such as "書" can be expressed like a printed character if there is a resolving power of 24 dots×24 dots. However, this is not restrictive, and the resolving power may also be 24 dots×32 dots. Accordingly, in the present embodiment, the display area is 2 cm×2 cm and a graphic display of 3 dots/mm is used and therefore, the area 2120 may be divided into four areas and proposed characters may be displayed in the respective divided areas. With regard to the characters thus displayed in the respective divided areas, character selection may be effected by the operator touching with the pin the area displaying the character to be input. In the present embodiment, characters may be displayed in three of the four divided areas.

In FIG. 5, reference numerals 1141–1144 designate special symbol input areas which indicate space, punctuation point, full stop and paragraphing, respectively. When the operator desires to input these special symbols, he may designate these areas by means of the pen tip thereby effect inputting. That is, when the pen tip has touched these areas 1141–1144, it is handled as the corresponding symbols having been input, and the symbols are displayed on the area 2120. As regards space and paragraphing, for example, "⌊⌋" and "⌊⌋" can be used as the displays on the area 2120. As special symbols, comma, period, colon, etc. may of course be provided in addition to these.

Figures 2, 6A:
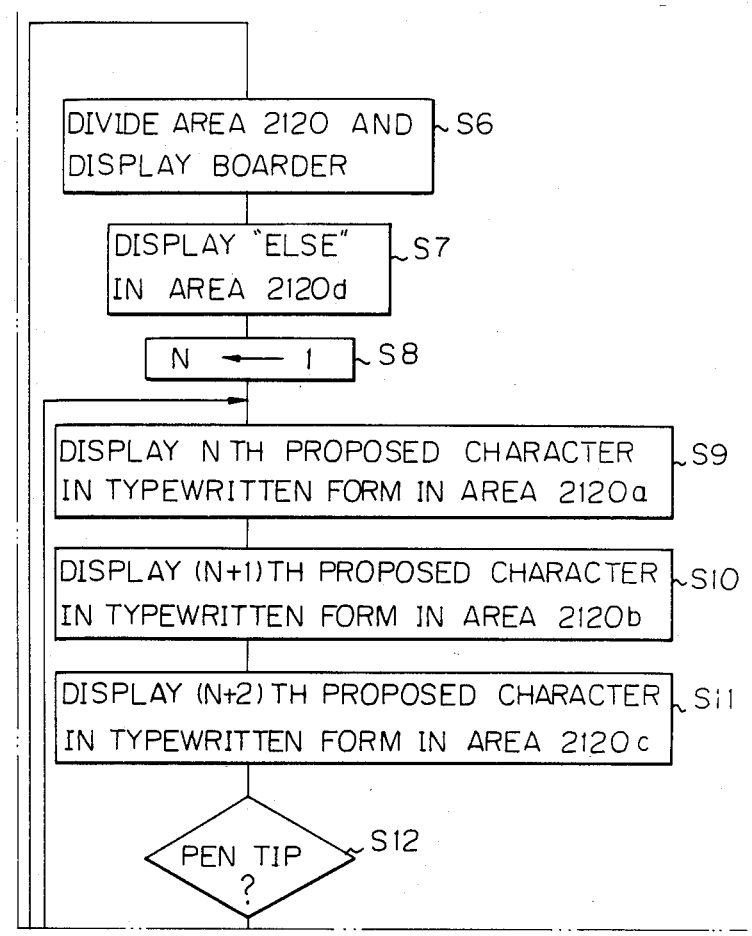
Figures 3, 6A:
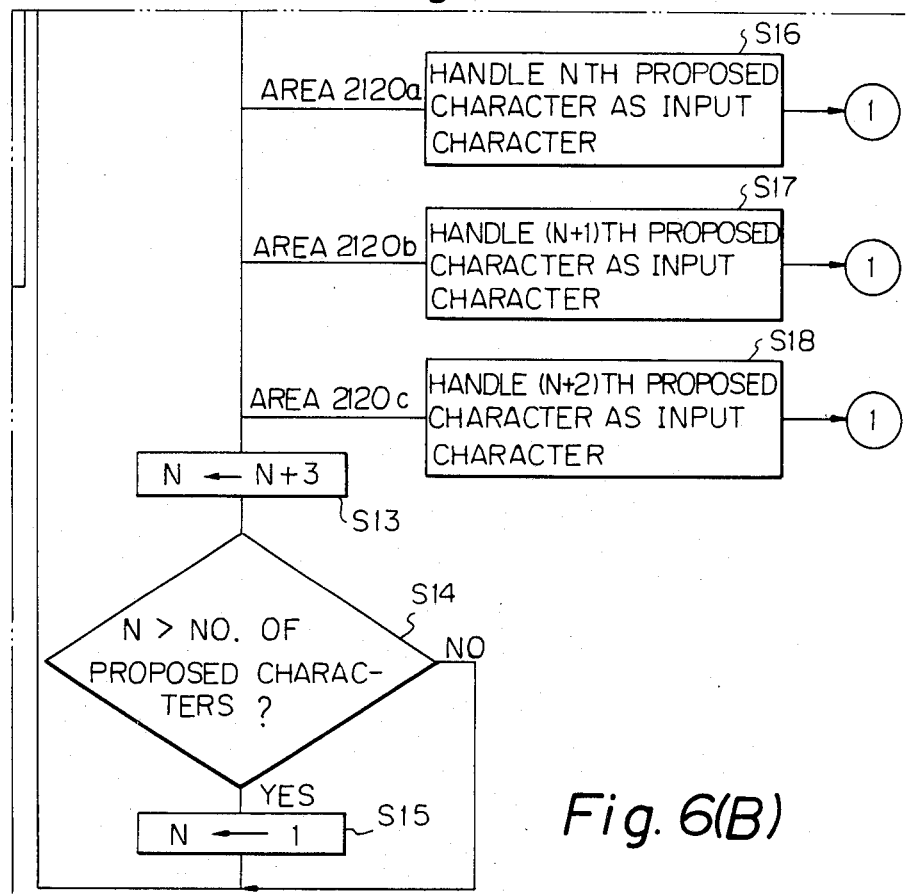
Figure 6B:
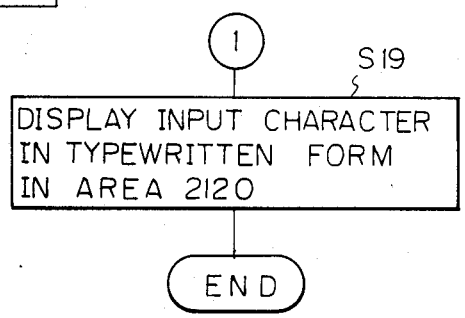
Figure 7A:
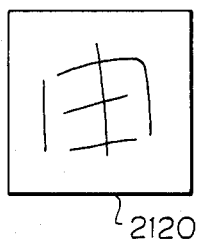
FIGS. 7(A)–(E)7 and 13(A)–(E) illustrate an example of the sequential display state in the course of processing according to an embodiment of the present invention.

FIGS. 6-A and 6-B show an example of the input-output processing procedure in the apparatus of the present invention. Also, FIGS. 7(A)–(E) show an example of the sequential display state of the display area 2120 in the course of processing. Description will hereinafter be made by taking as an example a case where, as in the description of the prior art, a character "中" is written into the area 2120 and a Chinese character is input. Before inputting, the display surface is as shown in FIG. 5. When the operator writes the character "中" into the area 2120 by means of the exclusive pen 2012, the display surface of the area 2120 becomes such as shown in FIG. 7(A). Then the processing procedure proceeds to step S2 because at step S1, it is judged that the pen position is within the area 2120, and the recognition process of the handwritten character is started. When the pen has touched the area 1114, it is handled as the end of the handwriting input and proposed characters are extracted. The processing hitherto is similar to that described with respect to the apparatus of FIG. 2.

Let it be assumed that at the end of step S2, referring to the RAM 2006, the CPU 2000 has extracted "中", "中", "中" and "中" as proposed characters. In this case, the number of proposed characters is 4 and it is not 1 and not a multiple of 3 and therefore, the processing procedure proceeds to step S5 via steps S3 and S4, registers the fifth and sixth proposed characters and space, tentatively sets the number of proposed characters to 6 and proceeds to step S6.

Figure 7B:
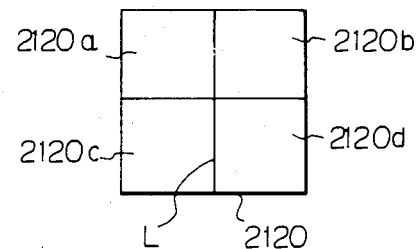
Figure 7C:
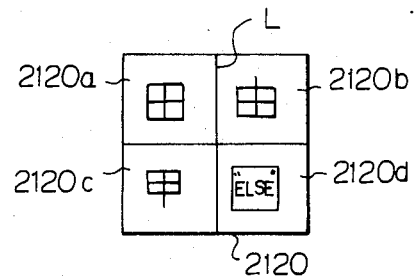

Hereupon, the area 2120 is divided into four sub-areas 2120a, 2120b, 2120c and 2120d with a border line L being displayed, as shown in FIG. 7(B). Then, at step S7, display "Else" is effected in the area 2120d, thereby informing that there is a proposed character besides the proposed characters being displayed, and when this area is selected thereafter, it is utilized to vary the output menu of proposed characters. At step S8, the number N indicating the order of the proposed characters is handled as "1", whereby initialization of the output menu is effected, and at steps S9, S10 and S11, proposed characters are put out in a typewritten form to the areas 2120a, 2120b and 2120c, as shown in FIG. 7(C).

Figure 7D:
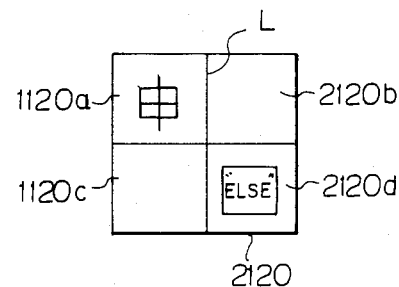
Figure 7E:
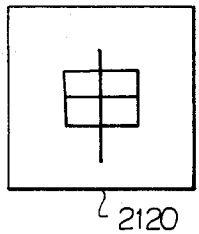

If at this time, the operator has input "中", the character "中" is not displayed and therefore, the area 2120d in which "Else" is displayed is touched by the pen tip, whereby the processing procedure proceeds from step S12 to step S13, at which the number is renewed so that the next proposed character outputting is effected from the fourth proposed character. At step S14, whether the number N has exceeded the total number of proposed characters is judged and, if the judgment is affirmative, initialization is effected at step S15, whereafter the processing procedure proceeds to step S9, and if the judgment is negative, the processing procedure proceeds directly to step S9 and repeats processing. The display screen, when the processing procedure has again reached step S12, is as shown in FIG. 7(D). Thereupon, the operator touches the area 2120a by means of the pen, whereby at step S16, he decides that the input character is "中". That is, by the position of the pen tip pointed to by the operator, the input character is decided at one of steps S16–S17. After this decision, at step S19 shown in FIG. 6(B), that character is enlargedly displayed in the area 2120 as shown in FIG. 7(E), whereupon the processing is terminated.

Also, when inputting special symbols such as space, "", " " and paragraphing, the pen tip touches the areas 1141, 1142, 1143 and 1144, whereby at step S1, negative judgment is rendered, and at step S20, the input characters are handled as space, "", " " and paragraphing, respectively, and the processing is terminated via step S19. As regards space, paragraphing, etc., if, as previously described, display is effected by using a symbol such as "⌊⌋" or "⌊⌋" as the expression on the area 2120, confirmation of the input can be made. Also, where there is only one proposed character in the recognition of a handwritten character, affirmative judgment is rendered at step A3, and at step S21, the input character is decided, and then the processing procedure proceeds to step S19, whereby display is effected without the area 2120 being divided.

In this manner, the present embodiment is designed such that a handwritten character is input to the handwritten character area, whereafter when there is a proposed character as a result of the character recognition, display is effected in the handwritten character area by an expression in the typewritten form of that character, and when there is a plurality of proposed characters, the handwritten character area is divided into a plurality of portions and the menu list of the proposed characters is put out in each of the divided areas by an expression in the typewritten form, and a corresponding character is selected from among the proposed characters by the pen touching the divided area in which that character is being displayed, whereby the selected character is displayed in the entire handwritten character area. As regards also the special symbols, design is made such that the designated symbol is displayed in the handwritten character area. Thus, there does not occur the cumbersomeness with which the operator must alternately watch the character editting screen such as the CRT screen and the character input screen such as the tablet, but the operator can effect the operation of inputting characters and symbols while watching only the vicinity of the handwritten character input area of the tablet, and actually, the operator can proceed with the work while confirming the characters input to the personal computer or the like without turning his eyes another way.

Figure 8B:
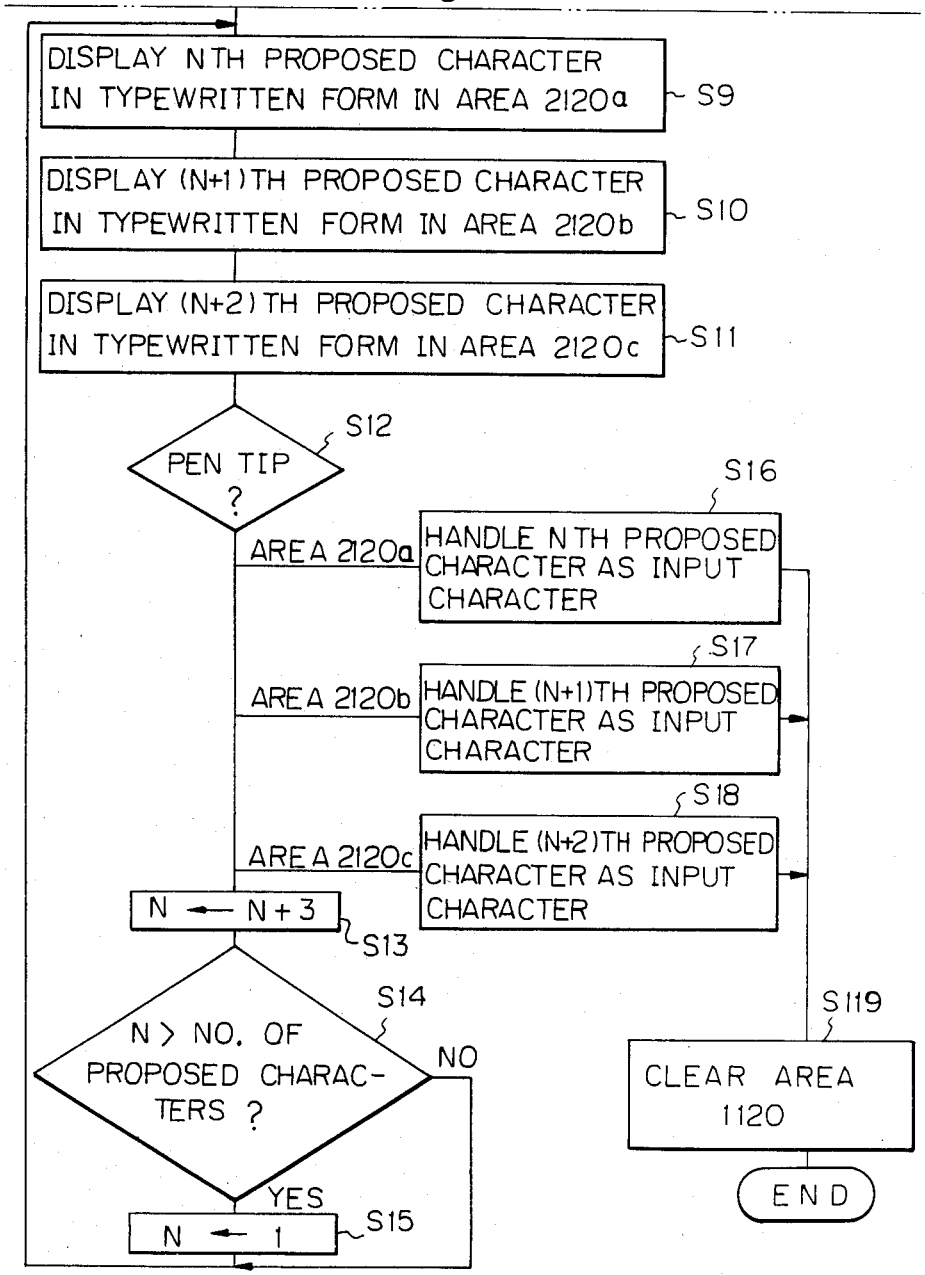

Second Embodiment:

FIG. 8 shows another embodiment of the present invention. In FIG. 8, processing steps similar to the processing steps in FIG. 6 are given similar reference characters and need not be described. In the present embodiment, even when the number of proposed characters is 1, the special handling like the processing shown in FIG. 6 is not done. Accordingly, the procedures of steps S3 and S21 in FIG. 6 are not effected. Also, when at step S1, it is judged that the pen tip is not within the handwritten character area 2120, a character corresponding to the pen position is registered as a proposed character at step S120, instead of handling the character corresponding to the pen position as an input character (step S20 of FIG. 6), and the number of proposed characters is regarded as 1 and the recognition process of handwritten character of step S2 is simulated. Thus, irrespective of the handwritten character input or the special symbol designation input, the area 1120 is divided at steps S6–S18, and proposed characters are displayed in the typewritten form in the respective divided areas, and the character menu-selected by the pen tip is handled as an input character. In this embodiment, the input character is not newly enlarged and displayed in the area 2120 and therefore, step S19 in FIG. 6-B becomes unnecessary and instead, step S19 is inserted after the processes at steps S16–S18 so that the display in the area 2120 can be cleared. In this embodiment, character inputting is possible even if the "ENTER" area 1115 on the tablet is not present and therefore, particularly the number of key words unfamiliar to beginners is reduced and thus, a system easy to use can be realized. Of course, the clearing of the area 2120 may not be executed at step S119, but may be executed by the main procedure in which the starting of inputting of a character is instructed after the completion of the character inputting, or alternatively may be executed prior to the starting of inputting of a character.

Although these two embodiments have been described with respect to the inputting of Chinese characters, the present invention is also of course applicable to the inputting of Japanese cursive letters or other characters and figures.

Also, in the above-described two embodiments, the display area has been divided into a plurality of areas so that proposed characters are displayed in the divided areas, whereas instead of effecting such division, it is also easy to make a design such that proposed characters are displayed successively on the display area at predetermined time intervals or in response to the designating operation by the operator and the character being displayed at the point of time that the operator has designated is an input character.

As described above, according to the present invention, character inputting, display of proposed characters and character selection can be accomplished by the use of only the tablet and therefore, there can be realized a character and figure input-output apparatus which enables the operator of the apparatus who may be a beginner to accomplish the inputting operation very easily.

Also, according to the present invention, as described above, during the inputting of a formal special symbol such as space, punctuation marks or paragraphing, the operator of the apparatus who may be a beginner can proceed with the operation while confirming the input by using only the tablet, and this leads to the possibility of realizing a character and figure input-output apparatus in which the inputting operation is very easy to accomplish.

Figure 9:
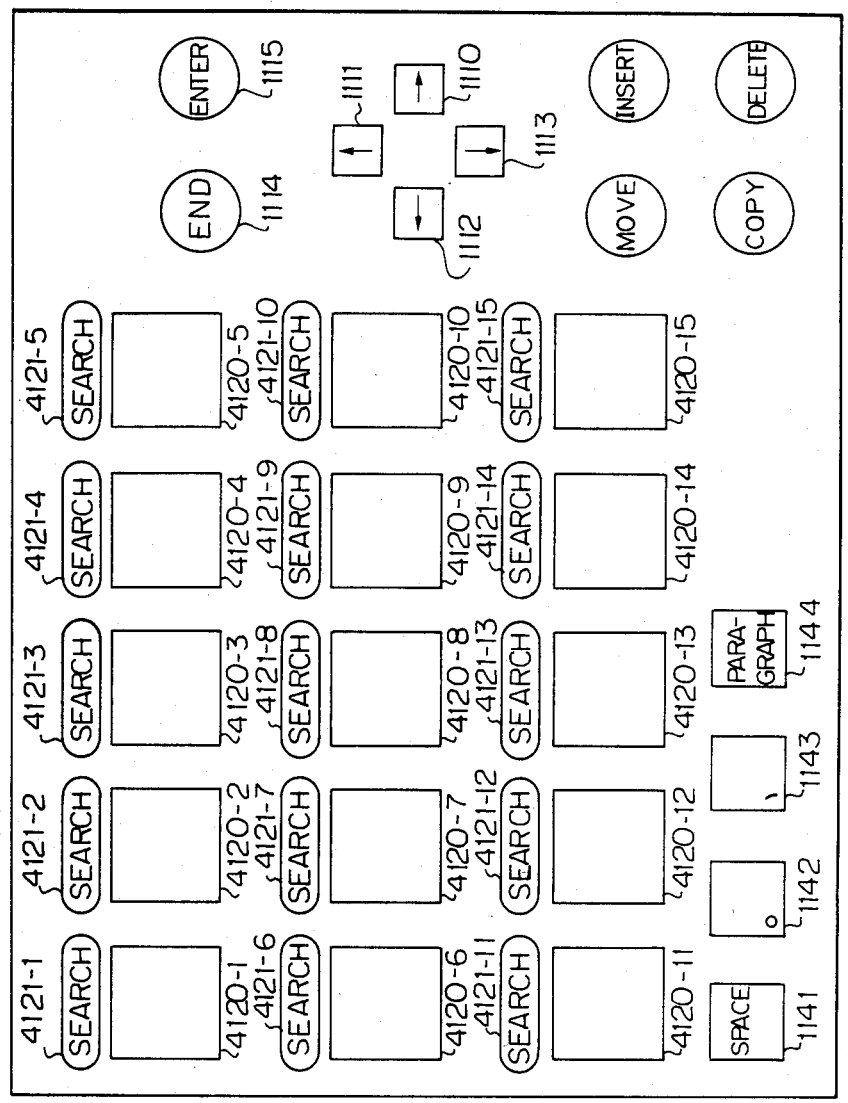

FIG. 9 shows an example of the operating surface 2101 of the digitizer 2010. In FIG. 9, areas similar to the areas on the operating surface 2101 in FIG. 5 are given similar reference numerals.

In FIG. 5, there has been only one handwriting area 2120, whereas in the present invention, there is provided a plurality of handwriting areas each for a character. That is, in the example shown, there are provided handwriting input areas 4120-1 to 4120-15 for fifteen characters. Graphic displays are provided under at least those areas to enable display to be effected. Further, search designating areas 4121-1 to 4121-15 are provided correspondingly to the handwriting input areas 4120-1 to 4120-15, and design is made such that when one of the search designating areas is designated, the corresponding handwriting input area is divided by a border line being displayed and the CPU 2000 refers to the dictionary developed in the RAM 2006 and displays proposed characters in those divided areas. Design is further made such that with regard to the characters displayed in the divided areas, the operator touches by means of the pen the area displaying the character to be input, whereby character selection is effected.

During such character inputting, the handwriting input area concerned with the inputting may be properly recognized by the CPU 2000. Also, when special character input areas 1141–1144 have been designated, display can be effected in a handwriting input area at an appropriate position as in the case of the inputting of the corresponding code or handwritten character. As regards space and paragraphing among the special symbols, for example "⌴" and "↵", can be handled as the display on the area 2120. Further, as special symbols, comma, period or colon can of course be provided in addition to these.

The inputting procedure in the present example will hereinafter be described.

Figures 2, 10A:
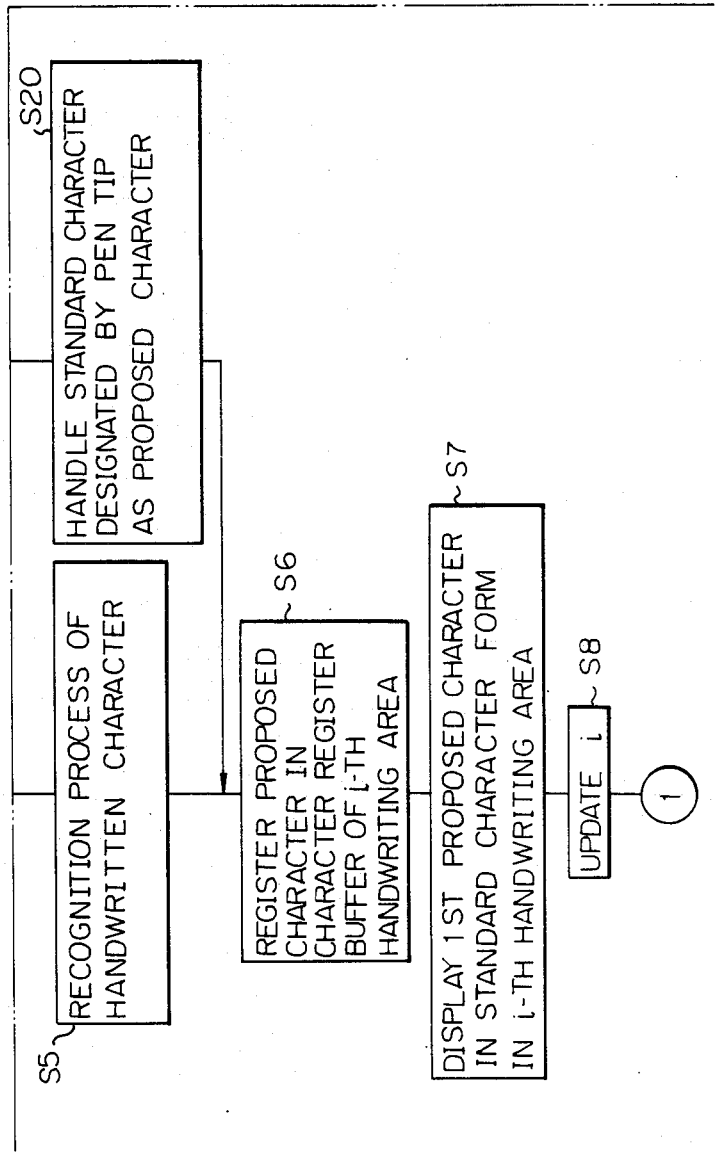

FIGS. 10-A and 10-B show an example of the input-output processing procedure in the apparatus of the present invention. FIGS. 11(A)–(F) show an example of the sequential display state of the area 4120 in the course of processing. Description will hereinafter be made by taking as an example a case where the operator inputs two characters "科学" and further designates paragraphing.

Figure 11A:
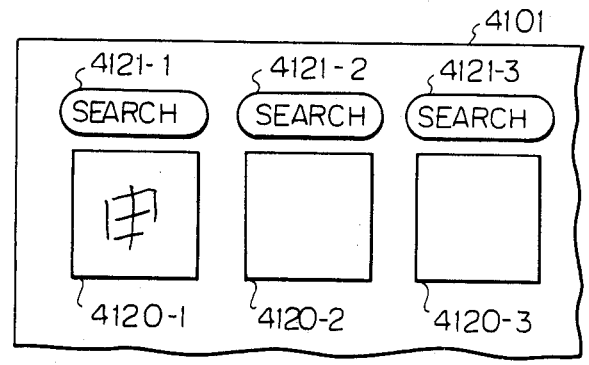
FIGS. 11(A)–(F) illustrate an example of the sequential display state in the course of processing according to an embodiment of the present invention.

First, when a character "科" is written in the area 4120-1 by the pen 2012, the operating surface 2101 of the tablet becomes such as shown in FIG. 11(A). The procedure then clears all the surfaces of the handwriting areas 4120-1 to 4120-15 at step S1 and brings about a state in which there is no input character, and at step S2, an index i for recognizing the area concerned with the inputting is handled as 1 and it is assumed that the input area is the area 4120-1. Then, when it is judged at step S3 that the pen tip is within the area 4120-1, the procedure proceeds to step S4 and the handwriting area number i is specified as 1. At step S5, the handwritten character "科" is recognized in response to the handwriting input of the operator and the locus thereof is displayed in the area 4120-1. Subsequently, when the operator is about to input a character "学" to the area 4120-2, the pen tip comes off the character recognizing area 4120-1 at step S5, whereby it is construed that the handwriting has been terminated, and the result of the recognition is determined.

Let it be assumed that in the result of this recognition, the first proposed character is "科" and "日", "科" and "牙" are mentioned as proposed characters. Thus, at step S6, "科", "日", "科" and "牙" are registered as the characters for the first handwriting area. This registration can be accomplished, for example, by providing a character registering portion for the first to fifteenth handwriting areas in the RAM 4006, and registering the character codes of the characters mentioned as proposed characters and the number of them therein.

So, at step S7, the first proposed character "科" is displayed in a standand character form like a printed character in the area 4120-1 after the handwritten input character has been erased. Where this displayed character cannot later be taken out as a code, the code of the displayed character is registered in the above-mentioned character registering portion or the like. At step S8, the value of i is increased by 1 to assume the next handwriting area. When the value of i exceeds the number of handwriting areas, the process of correcting the handwriting area into an area to which a character can be input, such as rendering i into 1, is effected, and then the procedure returns to step S3.

Figure 11B:
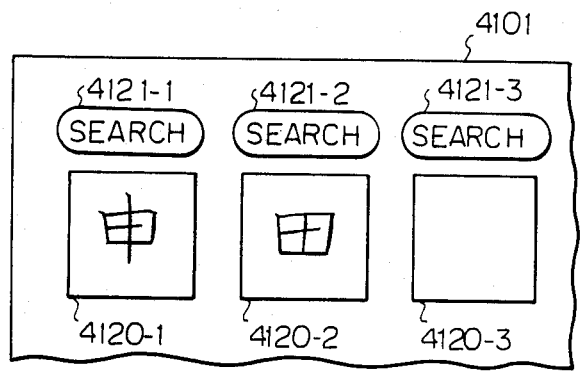

When the operator subsequently inputs "௸", the pen tip is within the area 4120-2 at step S3 and therefore, character recognition is again effected at step S5 via step S4. Hereupon, when the operator touches the area 1114 by means of the pen tip or subsequently effects inputting, the inputting of "௸" is terminated and the pen tip comes off the area 4120-2, whereby it is judged that the handwriting has been terminated, and the result of the recognition is displayed. Let it be assumed that at this time, for example, "௸" has been mentioned as the first proposed character and "௸" has been mentioned as another proposed character. So, at step S6, these proposed characters are registered, and at step S7, "௸" is displayed in a standard character form in the area 4120-2. Then the procedure again reaches step S3 via step S8. When, at this time, the operator keeps the pen tip spaced apart, he is in the input stand-by state. The then operating surface 2101 is such as shown in FIG. 11(B).

Figure 11C:
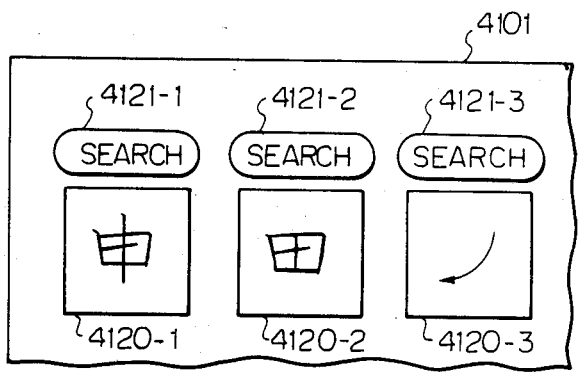

When the operator is to give the instruction of "paragraphing", he touches the area 1144 by means of the pen tip. Thereupon, the procedure shifts to step S20 via steps S3 and S9, and the code of the symbol corresponding to the area touched by the pen tip, in this case, the code indicative of paragraphing, is decided as the code of the proposed character in a form similar to the result of the recognition of handwritten character at step S5. FIG. 11(C) shows this state. At this time, the area concerned with the inputting assumes the handwriting position as the area 4120-3 prior to the handwritten input by step S2 or step S8 and therefore, the special codes can thereafter be handled in the same manner as the manner in which the handwritten input is effected.

Let is be assumed that the operator understands that not " 10 " but " 10 " has been recognized and desires to change the character "௸" to the character "௸". When the operator touches the search area 4121-1 by means of the pen tip, the procedure shifts from step S3 to step S11 via step S9 at which whether the pen tip is within the standard character area is judged and step S10 at which whether the pen tip is within a search area is judged. At step S11, the number j of the handwriting area corresponding to the search area being touched by the pen tip is registered. Here, j is 1, and the process of selecting the menu of proposed characters registered in the area 4120-1 is started.

Figure 11D:
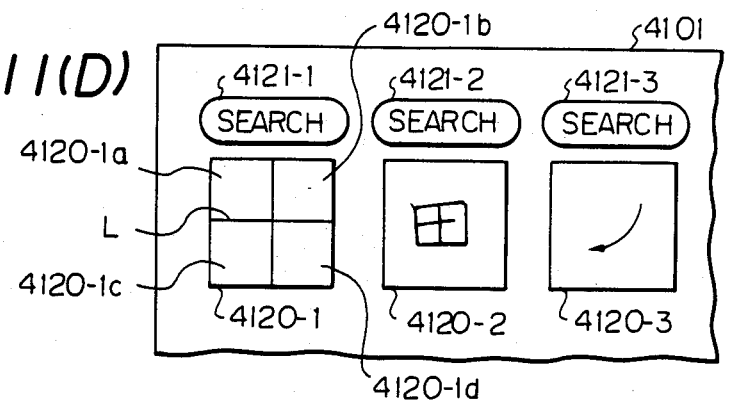
Figure 11E:
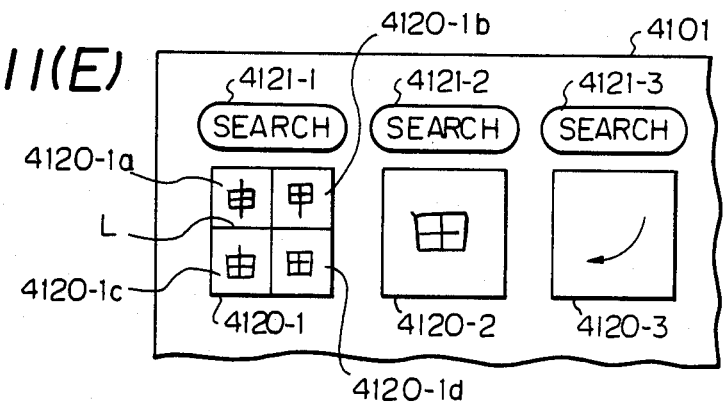
Figure 11F:
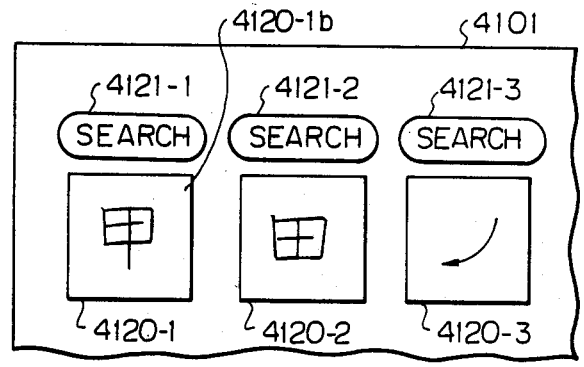

At step S12, the handwriting area 4120-1 is divided into four by a line L as shown, for example, in FIG. 11(D). Subsequently, at step S13, the number k of a proposed character to be menu-displayed is initialized into 1. At step S14, four characters "௸", "௸", "௸" and "௸" are displayed sequentially from the first proposed character in the part areas 4120-1a, 4120-1b, 4120-1c and 4120-1d, respectively, of the area 4120-1 divided into four. At this time, the operating surface 4101 is such as shown in FIG. 11(E). When the operator causes the pen tip to touch the part area 4120-1b, the procedure proceeds to step S16 via step S15 at which whether the pen tip is within the handwriting area which is effecting selection is judged, and thereupon the character "௸" is selected and only "௸" is displayed in a standard character form in the area 4120-1. The then operating surface is such as shown in FIG. 11(F). At step S16, as at step S7, if the character code being displayed cannot be read out, the character code being displayed is re-registered in the corresponding character registering portion. Where the number of proposed characters exceeds the number of divided areas and the character desired to be input by the operator is not displayed, each time the operator causes the pen tip to touch the portion other than the part areas, negative judgment is brought at step S15, and the procedure proceeds to step S17. At step S17, the number k of the proposed character is increased by 4, and then the procedure returns to step S14, whereby all proposed characters can be displayed.

When, from the display state shown in FIG. 11(F), the operator touches the "ENTER" area 1115 by means of the pen tip, the procedure shifts to step S19 via steps S3, S9, S10 and S18 and the characters being displayed in the handwriting areas 4120-1 to 4120-15 are sequentially decided as input characters. In the case of the present example, two characters "௸" and "௸" and special symbol "௸" are successively input.

In this manner, in the present example, a search area for outputting to each handwriting area the menu list of proposed characters which is a result of recognition is provided, the first proposed character of the result of recognition is output to the handwriting area and the search area is touched by the pen tip, whereby the characters mentioned as the proposed characters of the result of recognition are successively output to the handwriting area, and a character newly selected from among them by the pen is replaced with the first proposed character and further, a character is input to a character recognizing area and, when the pen tip touches another character recognizing area, the preceding character inputting is regarded as having been terminated, and the result of character recognition is decided. Also, special symbols such as punctuation marks and paragraphing may be input to desired regions in the same manner as in the case of the handwriting input by designating special symbol input areas and may be displayed. As a result, a sentence consisting of a mixture of a series of Chinese characters and Japanese cursive characters is written one character by one character in the handwriting input area and, when the last character has been written, the recognition of the characters of the sentence is terminated as by touching the "END" area by means of the pen tip. At this point of time, the first proposed character in each handwriting area is re-displayed in the standard character form and therefore, the operator can judge any erroneous input simply by watching the same surface. If only the recognition rate of the handwritten character recognition is good, the inputting of the characters of the sentence is completed simply by touching the "ENTER" area by means of the pen tip. Accordingly, the operator can input characters in the same manner as that in which he writes on paper in a rough form and further, with regard to an erroneously judged character, a character to be input can be selected from among other proposed characters by menu selection, whereafter a sentence can be input.

In the present embodiment, description has been made of the inputting of Chineses characters, but of course, the present invention is also applicable to the inputting of cursive characters and other characters and figures.

Also, in the present embodiment, a handwriting input/display area is divided into a plurality of areas so that proposed characters are displayed in the divided areas, whereas such division need not always be effected, but it is also easy to make such a design that proposed characters are sequentially displayed on the corresponding handwriting input/display area at predetermined time intervals in response to the designation of the corresponding search area or in response to the successive search area designating operations by the operator and that the character displayed at the point of time designated by the operator is the input character.

According to the present invention, as described above, there can be realized a character and figure input-output apparatus in which a plurality of areas for effecting character handwriting input and display are provided on the tablet for effecting the character inputting operation so that display of proposed characters can be accomplished after the recognition of handwritten input characters and further, means for effecting the display of the proposed characters correspondingly to said areas is provided so that the operator can input a document with the same sense as that with which he writes characters on paper and also, character selection can be accomplished by the use of only the tablet, whereby the operator of the apparatus who may be a beginner can accomplish the inputting work very easily.

The present invention is also very readily applicable to an apparatus of other type in which there is not provided the special search areas for instructing the display of proposed characters as described above, but when a standard character is being displayed in the handwritten character input area after the termination of the recognition of input character, said area is designated to thereby effect the display of proposed characters.

According to the present invention, as described above, there can be realized a character and figure processing apparatus in which the tablet is provided with a plurality of handwriting input areas and input areas for special symbols such as space, punctuation marks and paragraphing and during the inputting of the special symbols, those areas are designated so that the symbols are input to and displayed on desired regions in the same manner as in the case of the ordinary handwritten character inputting and thus, the operator can proceed with his work by using only the tablet with the same sense as that with which he writes characters on paper while confirming the input, whereby the operator of the apparatus who may be a beginner can accomplish the inputting work very easily.

Still another embodiment of the present invention will now be described.

The inputting procedure in the present embodiment will hereinafter be described.

Figures 2, 12A:
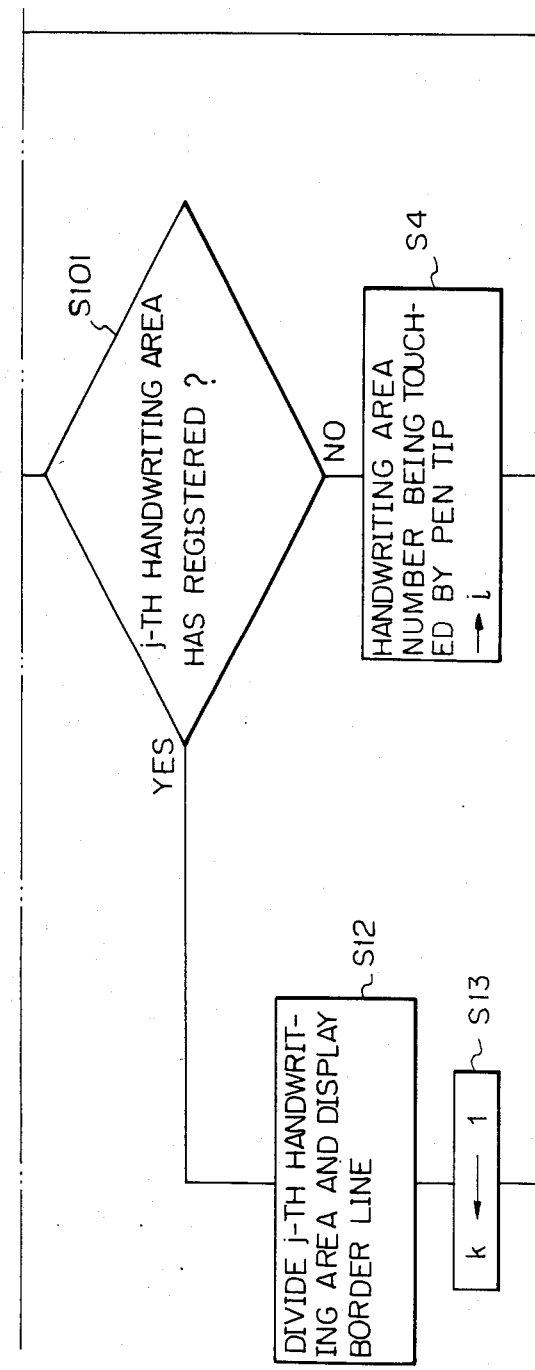
Figures 3, 12A:
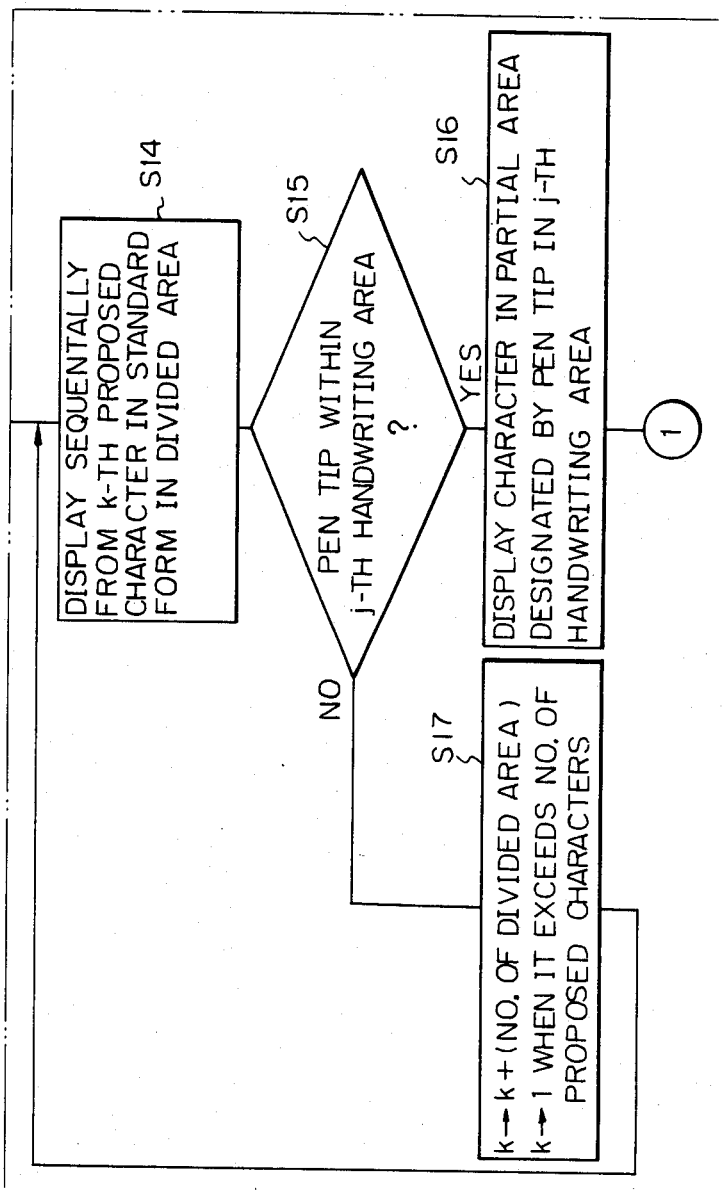
Figures 4, 12A:
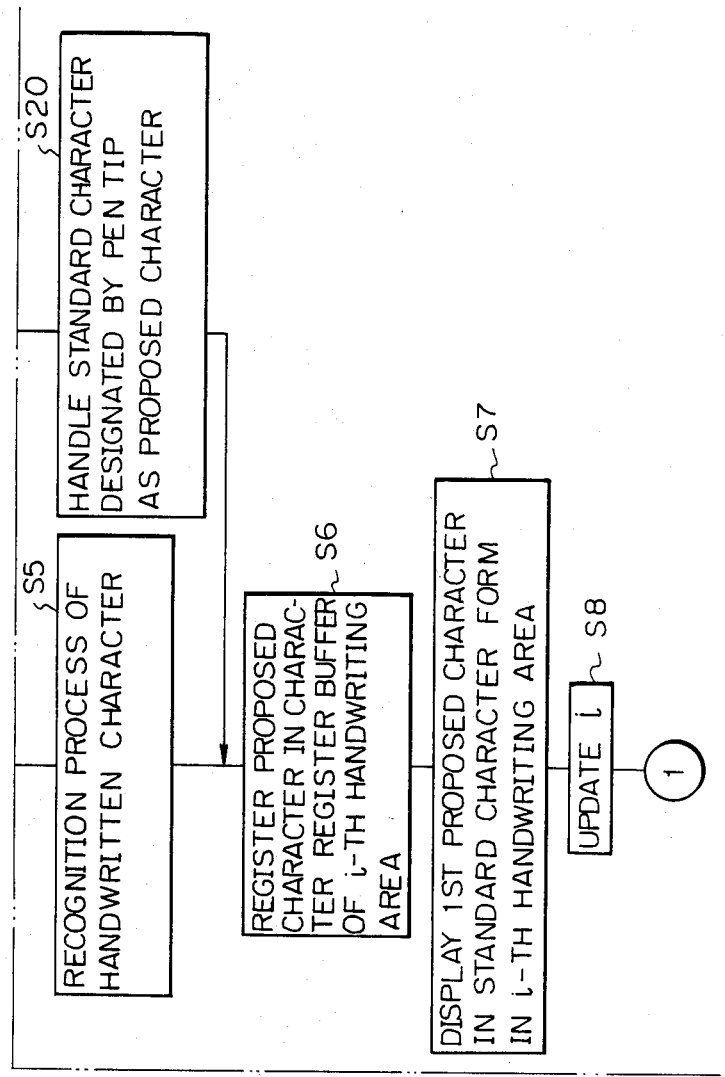

FIGS. 12(A) and (B) show an example of the input processing procedure in the apparatus according to the present embodiment. FIGS. 13(A)-(E) show an example of the successive display states of the area 4120, shown in FIG. 9, in the course of processing. Description will hereinafter be made by taking as an example a case where the operator inputs two characters " 10 ".

Figure 13A:
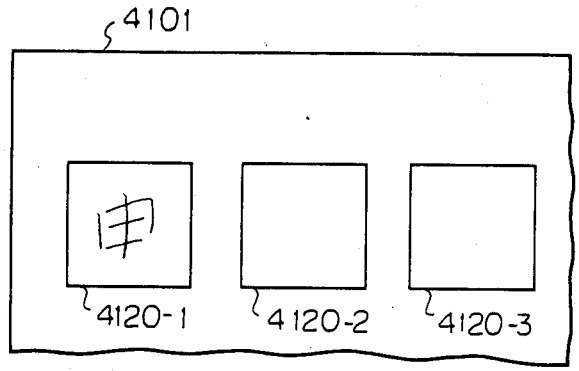

First when the operator writes a character " " in the area 4120 by means of the pen 2012, the operating surface 4101 of the tablet becomes such as shown in FIG. 13(A). The procedure then is such that at step S1, the characters input with all the surfaces of the areas 4120-1 to 4120-15 of the handwriting area being cleared are nullified and at step S2, the index i for recognizing the area concerned with the input is rendered into 1 and it is assumed that the input area is the area 4120-1. Then, when, at step S3, it is judged that the pen tip is within the area 4120-1, the procedure proceeds to step S100 and the number j of the handwriting area is registered. Here, j is rendered into 1. At the next step S101, whether the j-th handwriting area has registered a character is judged. If the judgment is negative, the procedure proceeds to step S4 and the number i of the handwriting area is specified as 1st. At step S5, the operator recognizes the handwritten character "卆" in conformity with his handwriting input and the locus thereof is displayed in the area 4120-1. Subsequently, when the operator is about to input the character "£" to the area 4120-2, the pen tip comes off the character recognizing area 4120-1 at step S5, whereby it is construed that the handwriting has been terminated, and the result of recognition is determined.

Let is be assumed that as the result of recognition, the first proposed character is "罗" and "毛", "爭" and "田" are mentioned as other proposed characters. So, at step S6, "毛", "爭", "£" and "爭" are registered as the characters of the first handwriting area. This registration can be accomplished as by providing character registering portions for the first to fifteenth handwriting areas in the RAM 2006 and registering the character codes of the proposed characters and the number of them therein.

At step S7, the first proposed character "卆" is displayed in a standard character form like a printed character in the area 4120-1 after the handwritten input character is erased. Where this displayed character cannot later be taken out as a code, the code of the displayed character is registered in the aforementioned character registering portion or the like. At step S8, the value of i is increased by 1 to assume the next handwriting area. When the value of i exceeds the number of handwriting areas, the process of correcting the next handwriting area to the area to which a character can be input, such as rendering i into 1, is effected, and the procedure returns to step S3.

Figure 13B:
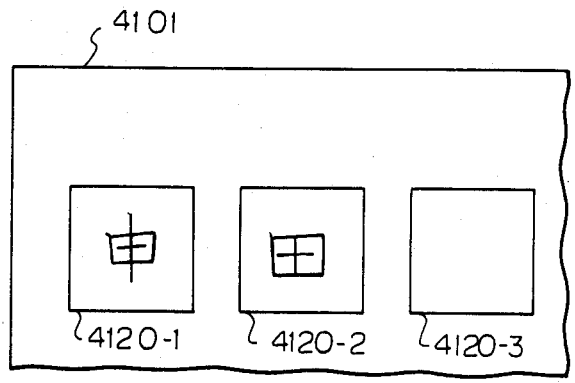

When the operator subsequently inputs "毛", the character is again recognized at step S5 via steps S100, S101 and S4 because, at step S3, the pen tip is within the area 4120-2. When the operator touches the area 1114 by means of the pen tip or subsequently effects inputting, the inputting of "罗" is terminated and the pen tip comes off the area 4120-2, whereby the handwriting is regarded as having been terminated and the result of recognition is displayed. Let it be assumed that at this time, "爭" and "爭" have been offered as the first proposed character and another proposed character, respectively. At step S6, the proposed characters are registered, and at step S7, "£" is displayed in the standard character form in the ares 4120-2. The procedure again reaches step S3 via step S8. If, at this time, the operator keeps the pen tip off the tablet, there will be brought about an input waiting state. The then operating surface 4101 is such as shown in FIG. 13(B).

When the operator is to give an instruction such as "paragraphing", he touches the special symbol input area by means of the pen tip. Thereupon, the procedure shifts to step S20 via steps S3 and S9, and the code of the symbol corresponding to the area touched by the pen tip is decided as the code of the proposed character in the same form as the result of the recognition of the handwritten character at step S5. At this time, as regards the area concerned with inputting, the handwriting position is assumed to be the area 4120-3 by step S2 or step S8 prior to the handwriting input and therefore, the special code also can thereafter be handled in the same manner as the handwriting input.

Referring again to FIG. 13(B), it is assumed that the operator sees such a display state and understands that not " 田 " but " 田 " has been recognized and be desires to change the character "田" to the character "囲". When the operator touches the handwriting input area 4120-1 by means of the pen tip, the procedure shifts from step S3 to step S101 via step S100, and since character registration has already been completed in the area 4120-1, affirmative judgment is rendered, and the procedure shifts to step S12.

Figure 13C:
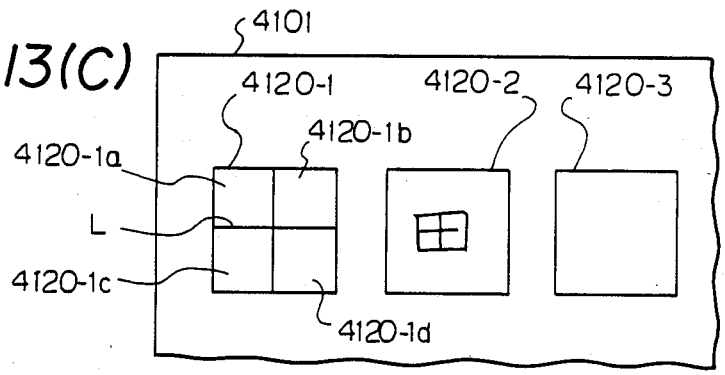
Figure 13D:
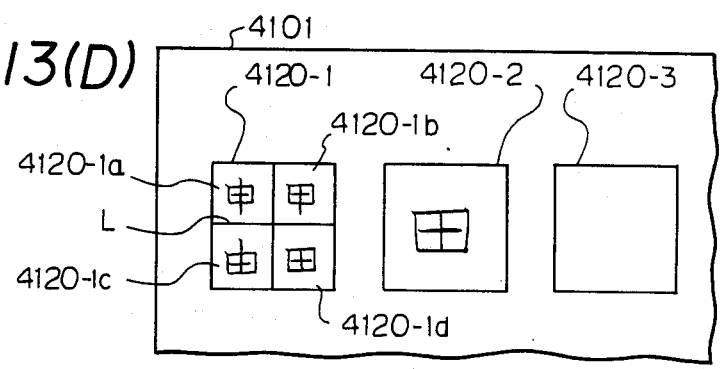
Figure 13E:
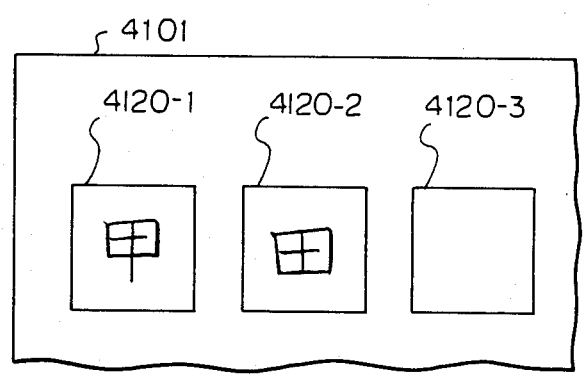

At step S12, the handwriting area 4120-1 is divided into four by a line L as shown, for example, in FIG. 13(C). Then, at step S13, the number k of the proposed character to be menu-displayed is initialized into 1. At step S14, four characters "囲", "囲", "囲" and "囲" are displayed in succession from the first proposed character in the part areas 4120-1a, 4120-1b, 4120-1c and 4120-1d, respectively, of the areas 4120-1 divided into four. At this time, the operating surface becomes such as shown in FIG. 13(D). When the operator causes the pen tip to touch the part area 4120-1b, the procedure proceeds to step S16 via step S15 at which whether the pen tip is within the handwriting area in which the selection is being effected is judged, and the character "囲" is selected and only "囲" is displayed in the standard character form in the area 4120-1. The then operating surface is such as shown in FIG. 13(E). Again at step S16, as at step S7, if the character code being displayed cannot be read, the character code being displayed is re-registered in the corresponding character registering portion. Where the number of proposed characters exceeds the number of divided areas and the character which the operator desires to input is not displayed, negative judgment is rendered at step S15 each time the operator causes the pen tip to touch the other portion than the part areas, and the procedure proceeds to step S17. At step S17, the value of the number k of the proposed character is increased by 4, and then the procedure returns to step S14, whereby all proposed characters can be successively displayed.

When, from the display state shown in FIG. 13(E), the operator touches the "ENTER" area 1115 by means of the pen tip, the procedure shifts to step S19 via steps S3, S9 and S18, and the characters displayed in the handwriting areas 4120-1 to 4120-15 are successively decided as input characters. In the case of the present embodiment, two characters "囲" and "囲" are subsequently input.

In this manner, in the present embodiment, the first proposed character of the result of recognition is output to the handwriting area and, when the pen tip touches the handwriting area after the input character has been registered, it is regarded as a proposed character menu selection starting instruction and the proposed characters of the result of recognition are successively output to the handwriting areas, and the character newly selected from among them by the pen tip is replaced with the first proposed character. Further, when a character is input to a character recognizing area and subsequently the pen tip touches another character recognizing area, the previous character inputting is regarded as having been terminated and the result of character recognition is decided. Also special symbols such as punctuation marks and paragraphing are input to desired regions as in the case of the handwriting input by designating the special symbol input areas and are displayed therein. As a result, a sentence consisting of a mixture of a series of Chinese character and Japanese cursive characters is written one character by one character in the handwriting input area and, when the last character has been written, the recognition of the characters of the sentence is terminated as by touching the "END" area by means of the pen tip. At this point of time, the first proposed characters in the respective handwriting areas are re-displayed in the standard character form and therefore, judgment of any erroneous input can be effected simply by watching the same surface. If only the recognition rate of the handwritten character recognition is good, the inputting of the characters of the sentence is completed simply by touching the "ENTER" area by means of the pen tip. Accordingly, the operator can input characters in the same manner as that in which he writes on paper in a rough form and further, with regard to an erroneously judged character, a character to be input can be selected from among other proposed characters by menu selection, and thereafter a sentence can be input.

Figure 14:
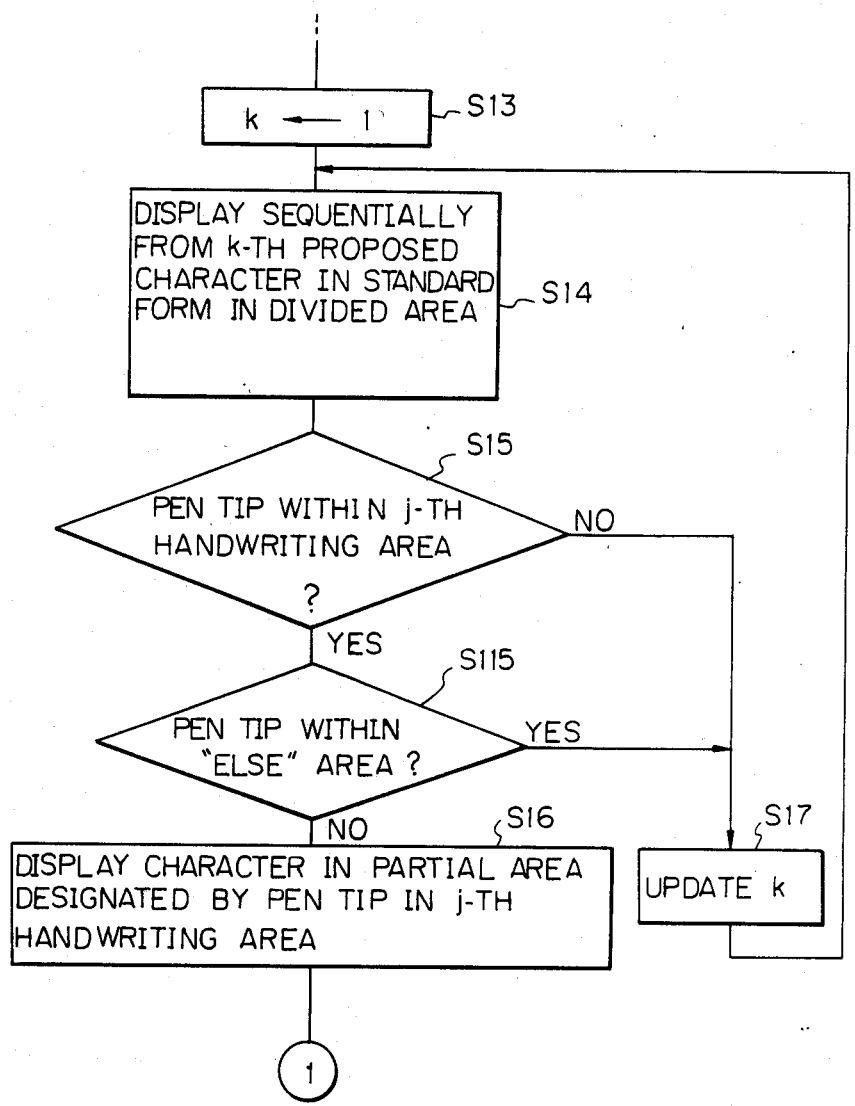

FIG. 14 shows another example of the input-output processing procedure in the apparatus of the present invention. This example is such that the processing procedures of step S15 and so on in FIG. 12 are rewritten as shown and when four or more different characters are proposed, the process of causing the characters other than four characters displayed at first to be displayed is made clearer to thereby meet the convenience of the operator.

Figure 15:
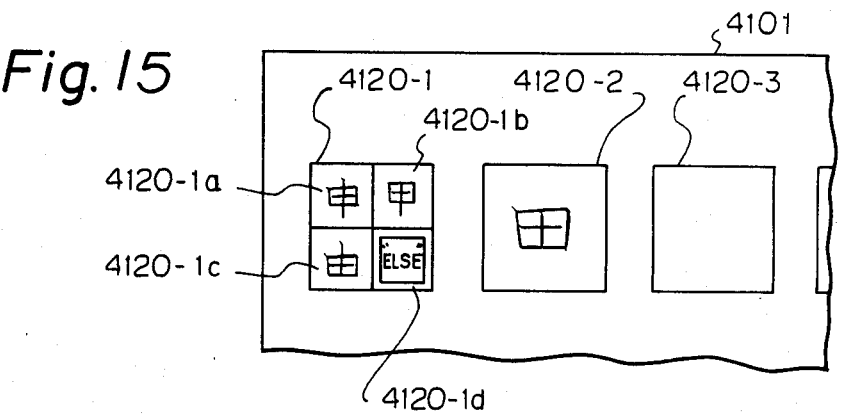
FIG. 15 shows an example of the display state by the processing procedure shown in FIG. 14.

That is, in the present example, where the number of proposed characters exceeds three in the process of step S14, the proposed characters are displayed in three of the divided areas and for example, "Else" is displayed in the remaining one area. FIG. 15 shows a state in which "Else" is displayed in the area 4120-1d after the displays of FIGS. 13(A)–(C) have been provided by a process similar to that previously described.

Then, when it is judged at step S15 that the pen tip is within the j-th handwriting input area, whether the pen tip is within the part area in which "Else" is displayed is judged at step S115 and, in the case of negative judgment, the procedure proceeds to step S16. On the other hand, when the pen tip is within the "Else" displaying area and when negative judgment is rendered at step S15, the procedure proceeds to step S117.

At step S117, the value of k is increased by a value smaller by 1 than the number of divided areas and, when the value of k exceeds the number of proposed characters, k is rendered into 1 and the procedure returns to step S14.

Thus, if, for example, in the display state of FIG. 15, the operator designates the "Else" displaying area, he can clearly recognize that other proposed character are displayed and therefore, there can be realized an input-output apparatus which is excellent in operability.

In the present embodiment, description has been made of the inputting of Chinese characters, but of course, the present invention can also be applied to the inputting of Japanese cursive characters or other characters and figures.

Also, in the present embodiment, a handwriting input/display area is divided into a plurality of areas and proposed characters are displayed in the divided areas, whereas such division need not always be done, but it is also easy to make such a design that for example, proposed characters are successively displayed at predetermined time intervals in conformity with the designation of a predetermined area or successively displayed on the corresponding handwriting input/display areas in conformity with the successive designating operations by the operator and the character being displayed at the point of time whereat the operator has designated is the input character.

According to the present invention, as described above, there can be realized a character and figure input-output apparatus in which the tablet for effecting character inputting operations is provided with a plurality of areas for effecting handwriting input and display of characters so that display of proposed characters can be effected after the recognition of the handwritten input characters and further, display of the proposed characters is effected correspondingly to the respective areas and therefore, the operator can input documents with the same sense as that with which he writes characters on paper and also, character selection can be effected by the use of only the tablet, whereby the operator of the apparatus who may be a beginner can accomplish the inputting work very easily.

I claim:

1. A character and figure processing apparatus comprising:
   coordinates input tablet having a handwriting input area for receiving handwritten character input;
   display means including a display area corresponding to said handwriting input area of said coordinates input tablet;
   designating means for designating the coordinates on said coordinates input tablet, including the handwritten character input;
   recognizing means for recognizing a character input to said area;
   display control means for dividing the display area of said display means and displaying a proposed character with regard to the recognized character in the divided display areas of said display means; and
   selecting means for selecting when one of the divided display areas displaying the proposed character is designated by said designating means, the character displayed in the one divided area as the character input to said handwriting input area.

2. A character and figure processing apparatus according to claim 1, wherein said designating means is in the form of a pen, and said coordinates input tablet detects the contact position of the tip of said pen as a coordinates input by an electromagnetic induction system.

3. A character and figure processing apparatus according to claim 1, wherein said coordinates input tablet is a transparent member in at least said handwriting input area, and the display area of said display means is disposed under said transparent member.

4. A character and figure processing apparatus comprising:
   a coordinates input tablet having a plurality of handwriting input areas for receiving handwritten character inputs;
   display means including display areas corresponding to said plurality of handwriting input areas of said coordinate input tablet;
   designating means for designating the coordinates on said coordinates input tablet, including the handwritten character inputs;
   recognizing means for recognizing the characters input to said handwriting input areas;
   display control means for dividing said corresponding display areas in response to said designating means to designate the display of the proposed characters and for displaying a first proposed character with regard to the recognized characters in one of said divided display areas, and displaying other proposed characters in said concerned divided display areas in conformity with the designation of said display area in which the display is being effected by said designating means; and
   selecting means for selecting, when one of said divided display areas displaying the proposed character is designated by said designating means, the characters displayed in said divided display areas as the chracters input to said handwriting input areas.

5. A character and figure processing apparatus according to claim 4, wherein said designating means is in the form of a pen, and said coordinates input tablet detects the contact position of the tip of said pen as a coordinates input by an electromagnetic induction system.

6. A character and figure processing apparatus according to claim 4, wherein said coordinates input tablet is a transparent member in at least said plurality of handwriting input areas, said display means is provided under said member, and the corresponding display areas are positioned under said plurality of handwriting input areas, respectively.

* * * * *

UNITED STATES PATENT AND TRADEMARK OFFICE
CERTIFICATE OF CORRECTION

PATENT NO. : 4,672,677
DATED : June 9, 1987
INVENTOR(S) : TADASHI YAMAKAWA

Page 1 of 3

It is certified that error appears in the above-identified patent and that said Letters Patent is hereby corrected as shown below:

COLUMN 1

Line 35, "Japanese" shuld read --Chinese--.

COLUMN 2

Line 29, "7(A)-(E)7" should read --7(A)-(E)--.

COLUMN 3

Line 23, "operation" should read --operator--.

COLUMN 4

Line 2, "extrememly" should read --extremely--.
Line 21, "charactor" should read --character--.
Line 37, "dots/nm" should read --dots/mm--.

COLUMN 5

Line 2, "pin" should read --pen--.

COLUMN 6

Line 16, """°",""" should read --""o"","\"--.
Line 19, """°",""" should read --""o"","\"--.
Line 50, "editting" should read --editing--.

COLUMN 9

Line 45, "is" should read --it--.
Line 46, "" 10" but " 10"" should read --
  --"田田"" but "田田""--.

UNITED STATES PATENT AND TRADEMARK OFFICE
CERTIFICATE OF CORRECTION

PATENT NO. : 4,672,677
DATED : June 9, 1987
INVENTOR(S) : TADASHI YAMAKAWA

It is certified that error appears in the above-identified patent and that said Letters Patent is hereby corrected as shown below:

COLUMN 10

Line 26, ""串" should read --"↲"--.
　　Line 67, "Chineses" should read --Chinese--.

COLUMN 11

Line 63, ""10"." should read --"甲田."--.
　　Line 64, "" "" should read --"甲"--.

COLUMN 12

Line 21, "is" should read --it--.
　　Line 57, "ares" should read --area--.

COLUMN 13

Line 9, "" 田" but " 田"" should read
　　　　--"甲田" but "甲田"-- and
　　"be" should read --he--.

COLUMN 14

Line 6, "character" should read --characters--.
　　Line 32, "than four" should read --than the four--.
　　Line 50, "S117" should read --S17.--.
　　Line 51, "S117," should read --S17,--.
　　Line 58, "character" should read --characters--.

UNITED STATES PATENT AND TRADEMARK OFFICE
CERTIFICATE OF CORRECTION

PATENT NO. : 4,672,677
DATED : June 9, 1987
INVENTOR(S) : TADASHI YAMAKAWA

It is certified that error appears in the above-identified patent and that said Letters Patent is hereby corrected as shown below:

COLUMN 15

Line 29, "coordinates" should read --a coordinates--.
    Line 43, "selecting when" should read
        --selecting, when--.

COLUMN 16

Line 16, "coordinate" should read --coordinates--.

Signed and Sealed this

Twelfth Day of June, 1990

*Attest:*

HARRY F. MANBECK, JR.

*Attesting Officer*    *Commissioner of Patents and Trademarks*